United States Patent
Lee et al.

(10) Patent No.: US 12,537,996 B2
(45) Date of Patent: Jan. 27, 2026

(54) DISPLAY DEVICE AND OPERATION METHOD THEREOF

(71) Applicant: SAMSUNG ELECTRONICS CO., LTD., Suwon-si (KR)

(72) Inventors: Jongin Lee, Suwon-si (KR); Sehyun Kim, Suwon-si (KR); Kwansik Yang, Suwon-si (KR); Kilsoo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/640,479

(22) Filed: Apr. 19, 2024

(65) Prior Publication Data

US 2024/0267592 A1 Aug. 8, 2024

Related U.S. Application Data

(63) Continuation of application No. PCT/KR2022/016054, filed on Oct. 20, 2022.

(30) Foreign Application Priority Data

Oct. 20, 2021 (KR) .................. 10-2021-0140486

(51) Int. Cl.
*H04N 21/466* (2011.01)
*G06F 3/14* (2006.01)
(Continued)

(52) U.S. Cl.
CPC ........... *H04N 21/4666* (2013.01); *G06F 3/14* (2013.01); *G06V 10/82* (2022.01);
(Continued)

(58) Field of Classification Search
CPC ......... H04N 21/4666; H04N 21/43635; H04N 21/443; G06V 10/82; G06V 30/42; G06V 30/19173; G06F 3/14
See application file for complete search history.

(56) References Cited

U.S. PATENT DOCUMENTS

| 11,146,859 B2 | 10/2021 | Choi |
| 2019/0050666 A1 | 2/2019 | Kim |

(Continued)

FOREIGN PATENT DOCUMENTS

| KR | 100722025 B1 | 5/2007 |
| KR | 20150076629 A | 7/2015 |

(Continued)

OTHER PUBLICATIONS

International Search Report for PCT/KR2022/016054, mailed Jan. 27, 2023, 4 pages.
(Continued)

*Primary Examiner* — Yassin Alata
(74) *Attorney, Agent, or Firm* — NIXON & VANDERHYE P.C.

(57) ABSTRACT

According to various embodiments, a display device and an operation method thereof are disclosed. The disclosed display device includes: a display, an input/output interface comprising circuitry, a communication interface comprising communication circuitry, a memory in which one or more instructions are stored, and at least one processor, comprising processing circuitry, individually and/or collectively, configured to execute the one or more instructions stored in the memory to cause the display device to: display an image screen received from an electronic device connected to the display device, determine whether execution of content starts by analyzing the displayed image screen using a first neural network model, call a second neural network model based on determining that the execution of the content starts,
(Continued)

obtain attribute information of the content by analyzing the image screen of the content using the second neural network model, and control an execution environment of the content based on the obtained attribute information.

14 Claims, 17 Drawing Sheets

(51) Int. Cl.
    *G06V 10/82*     (2022.01)
    *G06V 30/19*     (2022.01)
    *G06V 30/42*     (2022.01)
    *H04N 21/4363*     (2011.01)
    *H04N 21/443*     (2011.01)

(52) U.S. Cl.
    CPC ........ *G06V 30/19173* (2022.01); *G06V 30/42* (2022.01); *H04N 21/43635* (2013.01); *H04N 21/443* (2013.01)

(56) References Cited

U.S. PATENT DOCUMENTS

| | | | |
|---|---|---|---|
| 2020/0074596 A1 | 3/2020 | Chun | |
| 2020/0304883 A1* | 9/2020 | Choi | H04N 21/44231 |
| 2021/0031100 A1 | 2/2021 | Rickeby | |
| 2021/0136450 A1 | 5/2021 | Kim | |
| 2021/0146241 A1 | 5/2021 | Bleasdale-Shepherd | |
| 2021/0152870 A1 | 5/2021 | Lee | |

FOREIGN PATENT DOCUMENTS

| | | |
|---|---|---|
| KR | 20170101076 A | 9/2017 |
| KR | 20190031032 A | 3/2019 |
| KR | 20190125095 A | 11/2019 |
| KR | 20200026421 A | 3/2020 |
| KR | 20200037602 A | 4/2020 |
| KR | 20200072456 A | 6/2020 |
| KR | 20210054932 A | 5/2021 |
| KR | 20210078386 A | 6/2021 |

OTHER PUBLICATIONS

Written Opinion of the ISA for PCT/KR2022/016054, mailed Jan. 27, 2023, 5 pages.
Korea office action dated Dec. 3, 2025 for corresponding Korean Patent Application No. 10-2021-0140486 with English language translation.

* cited by examiner

DISPLAY DEVICE AND OPERATION METHOD THEREOF

CROSS-REFERENCE TO RELATED APPLICATIONS

This application is a continuation of International Application No. PCT/KR2022/016054 designating the United States, filed on Oct. 20, 2022, in the Korean Intellectual Property Receiving Office and claiming priority to Korean Patent Application No. 10-2021-0140486, filed on Oct. 20, 2021, in the Korean Intellectual Property Office, the disclosures of each of which are incorporated by reference herein in their entireties.

BACKGROUND

Field

The disclosure relates to a display device and an operation method thereof, and for example, to a display device that may provide a content execution environment based on content executed on the display device, and an operation method of the display device.

Description of Related Art

Recently, the number of game users has increased, and the demand to enjoy game content on large-screen TVs to increase immersion in games has increased.

In the related art, in the case of a cloud game that is executed in a software manner on a TV, image quality or sound suitable for the game may be set based on metadata such as a title or a genre of the game and a service such as a viewing age restriction may be provided.

In addition to such a cloud game, there is much demand for a game executed on a game console by connecting the game console to a TV by wire. However, in the case of a game executed on a game console that is connected by wire, because a TV only receives an execution screen of the game executed on the game console, it is impossible to obtain metadata such as a title or a genre of the game from the TV. Accordingly, in the case of a game executed on a game console connected by wire to a TV, a method of obtaining information about characteristics of the game executed on the game console is required to provide a game execution environment suitable for the characteristics of the game executed on the game console.

SUMMARY

Embodiments of the disclosure provide a display device that receives and displays content executed on an external device connected to the display device and obtains information about characteristics of the content from the received content to control a content execution environment of the display device, and an operation of the display device.

A display device according to an example embodiment may include: a display, an input/output interface comprising circuitry, a communication interface comprising communication circuitry, a memory in which one or more instructions are stored, and at least one processor, comprising processing circuitry, individually and/or collectively configured to execute the one or more instructions stored in the memory to cause the display device to: display an image screen received from an electronic device connected to the display device; determine whether execution of content starts by analyzing the displayed image screen using a first neural network model; call a second neural network model based on determining that the execution of the content starts; obtain attribute information of the content by analyzing the image screen of the content using the second neural network model; and control an execution environment of the content based on the obtained attribute information.

According to an example embodiment, at least one processor, individually and/or collectively, may be configured to execute the one or more instructions to cause the display device to: identify the electronic device from high-definition multimedia interface consumer electronics control (HDMI CEC) received through HDMI communication from the electronic device, and obtain the first neural network model trained corresponding to the identified electronic device.

According to an example embodiment, the first neural network model may include a model trained to receive a plurality of user interface (UI) screens, which may be received from the electronic device, as training data and classify the plurality of UI screens into a content-executable UI screen and a content-inexecutable UI screen.

According to an example embodiment, at least one processor, individually and/or collectively, may be configured to execute the one or more instructions to cause the display device to: determine whether switching occurs from the content-executable UI screen to the content-inexecutable UI screen by inputting the displayed image screen to the first neural network model and analyzing the image screen, and determine that the execution of the content starts based on determining that switching occurs from the content-executable UI screen to the content-inexecutable UI screen.

According to an example embodiment, the second neural network model may include a model trained to receive a plurality of image screens as training data and detect a text area or a logo area from the plurality of image screens.

According to an example embodiment, at least one processor, individually and/or collectively, may be configured to execute the one or more instructions to cause the display device to: extract the text area or the logo area from the plurality of image screens by inputting the plurality of image screens to the second neural network model and analyzing the image screens, and obtain attribute information of the content based on the text area or the logo area.

According to an example embodiment, at least one processor, individually and/or collectively, may be configured to execute the one or more instructions to cause the display device to: transmit text extracted from the text area or the logo area to a server, and obtain attribute information of the content by receiving attribute information of the content related to the text or the logo area from the server.

According to an example embodiment, at least one processor, individually and/or collectively, may be configured to execute the one or more instructions to cause the display to: control an execution environment of the content by controlling at least one of image quality setting, sound setting, viewing age restriction setting, and display device environment setting suitable for the content based on the obtained attribute information.

According to an example embodiment, at least one processor, individually and/or collectively, may be configured to execute the one or more instructions to cause the display device to: determine whether the execution of the content ends based on the controlling of the execution environment of the content, and determine whether execution of new content starts by analyzing an image screen using the first neural network model based on determining that the execution of the content ends.

According to an example embodiment, a method of operating a display device may include: displaying an image screen received from an electronic device connected to the display device; determining whether execution of content starts by analyzing the displayed image screen using a first neural network model; calling a second neural network model based on determining that the execution of the content; obtaining attribute information of the content by analyzing the image screen of the content using the second neural network model; and controlling an execution environment of the content based on the obtained attribute information.

According to an example embodiment, a non-transitory computer-readable recording medium having recorded thereon at least one program to be executed by a processor of a display device to perform a method of operating the display device, wherein the method of operating the display device includes: displaying an image screen received from an electronic device connected to the display device, determining whether execution of content starts by analyzing the displayed image screen using a first neural network model, calling a second neural network model based on determining that the execution of the content starts, obtaining attribute information of the content by analyzing the image screen of the content using the second neural network model, and controlling an execution environment of the content based on the obtained attribute information.

According to various example embodiments of the present disclosure, because there is provided a method by which, even when a display device receives and displays content executed on an external device connected to the display device, the display device obtains information about characteristics of the content from the received content, a content execution environment of the display device may be controlled according to the characteristics of the content. Accordingly, the display device may provide a user with a content experience matching the characteristics of the content.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
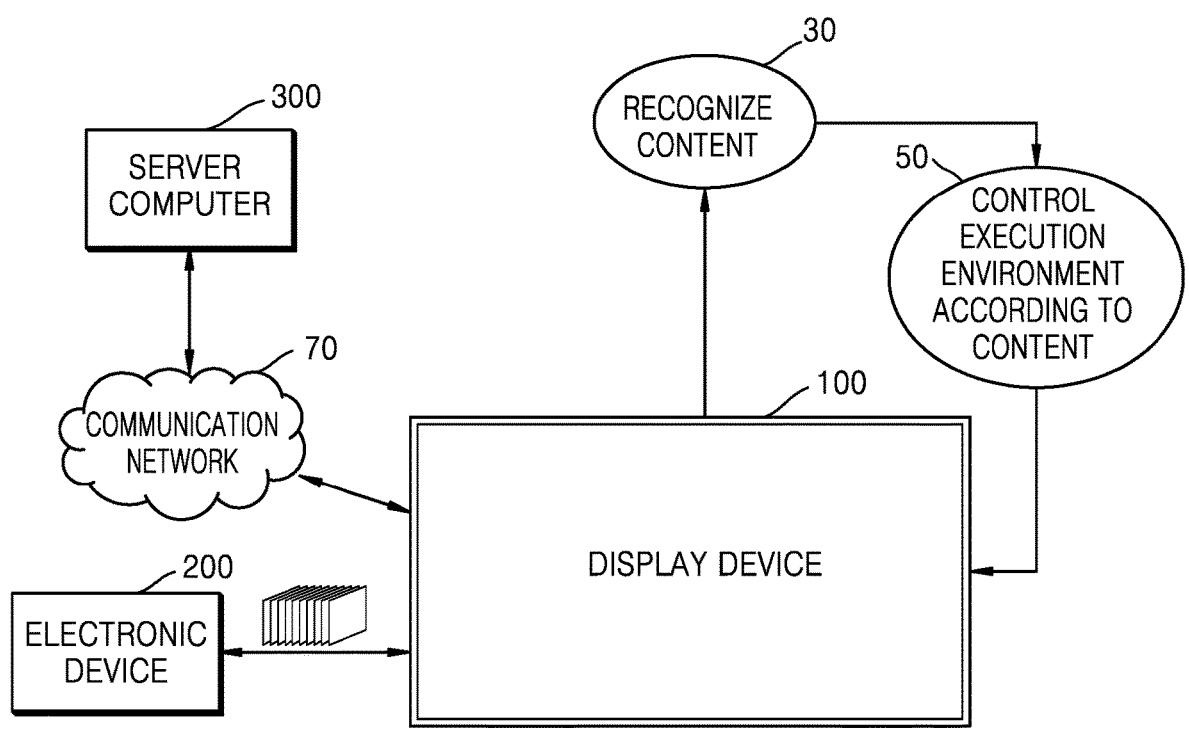
FIG. 1 is a diagram illustrating an example system for controlling an execution environment of a display device, according to various embodiments.

The terms used herein will be briefly described, and the present disclosure will be described in greater detail.

The terms used herein are general terms currently widely used in the art in consideration of functions in the present disclosure, but the terms may vary according to the intention of one of ordinary skill in the art, precedents, or new technology in the art. Also, some of the terms used herein may be arbitrarily selected, and in this case, these terms are defined based on the descriptions below. Accordingly, the specific terms used herein should be defined based on the unique meanings thereof and the whole context of the present disclosure.

It will be understood that when a certain part "includes" a certain component, the part does not exclude another component but may further include another component, unless the context clearly dictates otherwise. The term " . . . unit" or " . . . module" refers to a unit that performs at least one function or operation, and the unit may be implemented as hardware or software or as a combination of hardware and software.

Embodiments will now be described more fully with reference to the accompanying drawings. However, the present disclosure may be embodied in many different forms and is not limited to the embodiments set forth herein. For clarity, portions irrelevant to the descriptions of the present disclosure may be omitted in the drawings, and like components are denoted by like reference numerals throughout the disclosure.

The term "user" used herein refers to a person who controls a function or an operation of a computing device or an electronic device using a control device, and may include a viewer, a manager, or an installation engineer.

FIG. 1 is a diagram illustrating an example system for controlling an execution environment of a display device, according to various embodiments.

Referring to FIG. 1, the system may include a display device 100, an electronic device 200, and a server computer 300.

Referring to FIG. 1, the display device 100 according to an embodiment may include an electronic device that receives content from various sources and displays the received content. The display device 100 may be any of various devices such as, for example, and without limitation, a TV, a set-top box, a mobile phone, a tablet PC, a digital camera, a camcorder, a laptop computer, a desktop, an electronic book terminal, a digital broadcasting terminal, a personal digital assistant (PDA), a portable multimedia player (PMP), a navigation device, an MP3 player, a wearable device, etc.

The display device 100 may be a fixed electronic device located at a fixed position or a portable mobile electronic device, and may be a digital broadcast receiver capable of receiving digital broadcasts.

The display device 100 may be controlled by any of various devices such as a remote controller or a mobile phone using infrared (IR), Bluetooth (BT), or Wi-Fi.

The electronic device 200 may execute content and may transmit a content execution screen to the display device 100 through wired/wireless communication. For example, the electronic device 200 may include, for example, a game console manufactured by any of various manufacturers. A user may allow game content to be executed using the electronic device 200 and may connect the electronic device 200 to the display device 100 through wired/wireless communication so that an executed game content screen is displayed on the display device 100.

The display device 100 may control an environment of the display device 100 according to characteristics or attribute information of content displayed on the display device 100. For example, the display device 100 may perform appropriate image quality processing, set sound, or provide a service such as a viewing age restriction according to attribute of content displayed on the display device 100.

However, when the display device 100 receives a screen as a result of executing content from the electronic device 200, it may be difficult for the display device 100 to directly obtain attribute information about the content corresponding to the received screen from the electronic device 200. Accordingly, in this situation, there is required a method by which the display device 100 obtains information or attribute information about the content received from the content execution screen received from the electronic device 200.

In order for the display device 100 to obtain the attribute information about the content from the content execution screen received from the electronic device 200, the content execution screen received from the electronic device 200 should be analyzed. In this case, when the display device 100 attempts to obtain the attribute information of the content by analyzing all image frames received from the electronic device 200, the accuracy of the analysis may be reduced and there may be a significant waste of resources including time in the analysis.

Accordingly, according to an embodiment, the display device 100 recognizes (30) content by systematizing a process of analyzing a content execution screen received from the electronic device 200 and controls (50) a content execution environment of the display device 100 using attribute information of the recognized content. When a 'content execution environment is controlled', it may refer, for example to, when the display device 100 displays an image screen received from the electronic device 200, a setting environment of the display device 100 being controlled to provide a better experience to a user according to characteristics of the image screen displayed on the display device 100. Although content is actually executed on the electronic device 200 and the display device 100 receives and displays a content execution screen from the electronic device 200, controlling setting information according to the execution screen in the display device 100 may be referred to as "content execution environment control" for convenience of explanation.

According to an embodiment, the display device 100 may determine whether execution of content starts by analyzing an image screen received from the electronic device 200. To obtain attribute information of the content, it may be preferable to analyze a screen after specific content is selected by a user and is executed. Before selecting and executing actual content, various image screens, for example, a setting screen or a user interface (UI) screen through which execution of content may be selected, may be preceded. However, because content to be executed has not yet been selected in this state, there will be no need to extract attribute of the content from the UI screen at this stage. Accordingly, it may be preferable for the display device 100 to find a point where execution of content starts before extracting attribute information of the content and perform analysis to extract the attribute information of the content after the found point.

According to an embodiment, the display device 100 may use a first neural network model to analyze whether execution of content starts from an image screen received from the electronic device 200. The first neural network model may be a first neural network model specialized for the electronic device 200, which is used to determine whether execution of content starts from image screens provided from the electronic device 200 by being trained based on the image screens provided by the electronic device 200.

According to an embodiment, when it is determined that the execution of the content starts by analyzing the image screen received from the electronic device 200, the display device 100 may perform an operation of obtaining attribute information of the content from the image screen received from the electronic device 200 by calling a second neural network model. For example, the display device 100 may recognize a text area or a logo area from the image screen received from the electronic device 200 and may obtain attribute information of the content based on the recognized text area or logo area. The attribute information of the content may include, for example, metadata of the content such as a title or a genre of the content or viewing age information of the content.

According to an embodiment, the display device 100 may control an execution environment of the content based on the obtained attribute information of the content. The execution environment of the content may include an image quality processing portion for processing or controlling video data displayed on the display device 100, a sound setting portion for processing or controlling audio data output from the display device 100, and a service such as a viewing age restriction, while the display device 100 reproduces the audio/video data included in the content.

The server computer 300 may communicate with the display device 100 through a communication network 70. The server computer 300 may receive a request from the display device 100 through the communication network 70 and may transmit a response to the request to the display device 100.

According to an embodiment, although the display device 100 may store the first neural network model or the second neural network model used to analyze an image screen received from the electronic device 200, or the display device 100 may request and receive the first neural network model or the second neural network model from the server computer 300. The display device 100 may receive an updated version of the first neural network model or the second neural network model from the server computer 300 periodically or upon request.

According to an embodiment, when the display device 100 obtains the attribute information about the content by recognizing the text area or the logo area by analyzing the image screen received from the electronic device 200, the display device 100 may transmit information about text extracted from the recognized text area or the logo area to the server computer 300 and may receive attribute information of the content obtained based on the text or the logo area transmitted from the server computer 300.

According to an embodiment, the server computer providing the first neural network model or the second neural network model may be the same as or different from the server computer providing the attribute information of the content obtained based on the text or the logo area.

Figure 2:
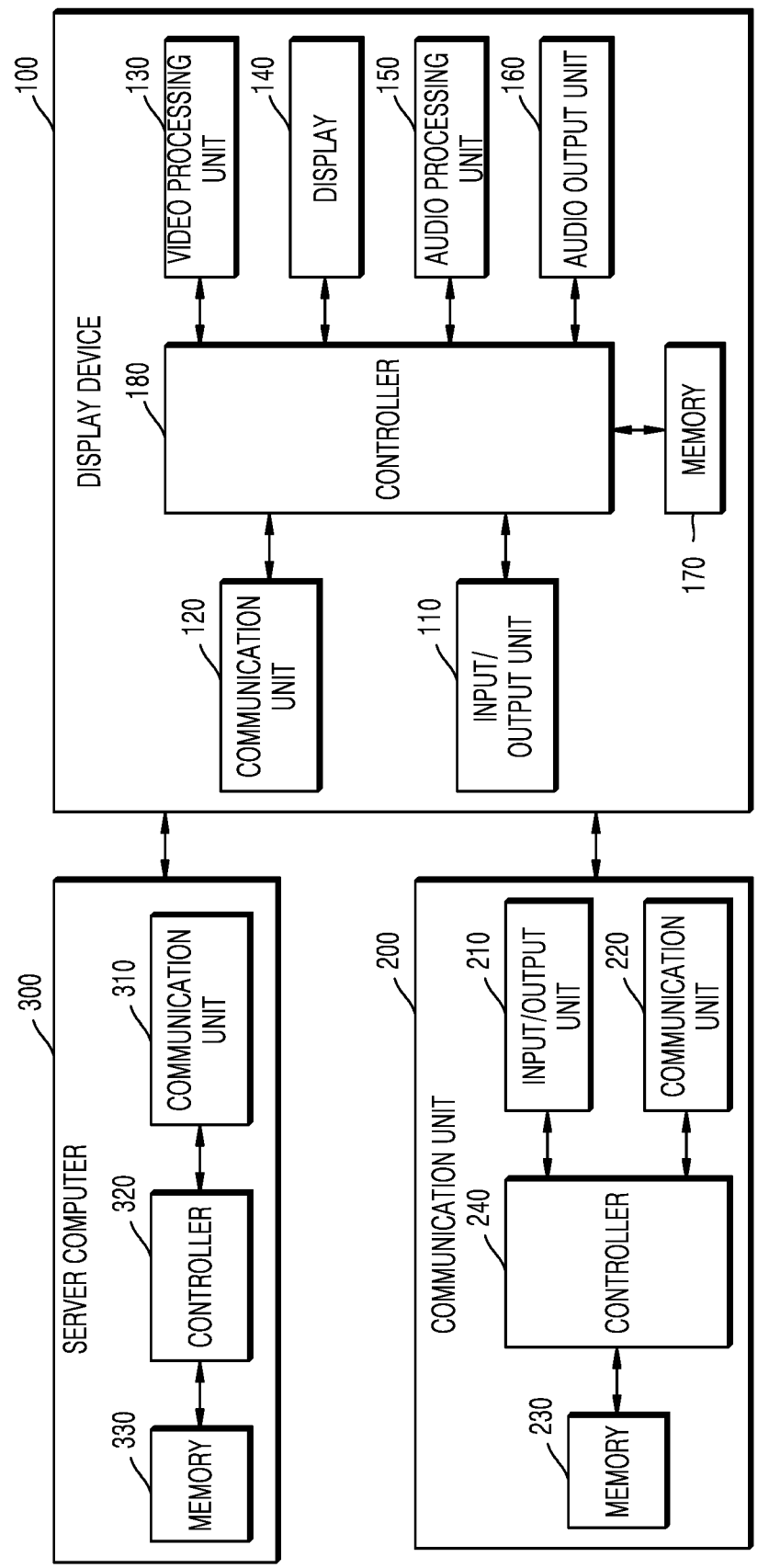
FIG. 2 is a block diagram illustrating an example configuration of a system including a display device, an electronic device, and a server computer, according various embodiments.

FIG. 2 is a block diagram illustrating an example configuration of a system including a display device, an electronic device, and a server computer, according to various embodiments.

Referring to FIG. 2, the system may include the display device 100, the electronic device 200, and the server computer 300.

The electronic device 200 connected by wire or wirelessly to the display device 100 to transmit and receive data and/or content may execute, for example, game content, and may transmit a content execution screen to the display device 100. Of course, the electronic device 200 may also transmit video content and/or audio content other than game content.

The electronic device 200 may be any device connected to the display device 100 to transmit and receive data. Examples of the electronic device 200 may include various electronic devices capable of providing content to the display device 100, such as, for example, and without limitation, a set-top box, a DVD player, a Blu-ray disc player, a PC, a game player, or the like. The electronic device 200 and the display device 100 may be connected through various connection means to transmit and receive content. The various connection means may include, for example, a cable, and the electronic device 200 and the display device 100 may include one or more ports for cable connection. The one or more ports may include a digital input interface such as a high-definition multimedia interface (HDMI) port, a display port, or a type-C.

For example, the electronic device 200 may be a device dedicated to game content such as a game console. However, the electronic device 200 is not limited to a game console, and may be any device capable of providing various content such as game content, movie content, and video content.

The electronic device 200 may include an input/output unit (e.g., including various input/output circuitry) 210, a communication unit (e.g., including communication circuitry) 220, a memory 230, and a controller (e.g., including processing and/or control circuitry) 240.

The input/output unit 210 may include various input/output circuitry and may be connected by wire to an external device to input or output data. According to an embodiment, the input/output unit 210 may be connected by wire to an input/output unit 110 of the display device 100 to transmit an execution screen of content executed on the electronic device 200 to the display device 100. The input/output unit 210 may include, for example, an HDMI port.

According to an embodiment, the input/output unit 210 may transmit device information about the electronic device 200 to the display device 100 when the electronic device 200 is connected to the display device 100 through an HDMI protocol.

The communication unit 220 may include various communication circuitry and may be connected wirelessly to an external device to input or output data. According to an embodiment, the communication unit 220 may be connected wirelessly to the communication unit 110 of the display device 100 to transmit an image screen executed on the electronic device 200 to the display device 100.

The memory 230 may include data processed by the controller 240 and applications used for processing by the controller 240. For example, the memory 230 may store one or more game applications executed by the controller 240 and execution result data of the game applications.

The controller 240 may include various processing and/or control circuitry and generally control elements of the electronic device 200. The controller 240 may execute a game application by executing instructions stored in the memory 230. Details of the function, structure and operation of the processor(s) described below are equally applicable to the controller 240.

When game content is executed on the electronic device 200, a user input for controlling execution of the game content may be received from a remote device controller that controls the electronic device 200. The electronic device 200 may directly receive a user input of the remote device controller that controls the electronic device 200 from the remote device controller, or the remote device controller may be connected to the display device 100 and a user input from the remote device controller may be received through the display device 100.

The display device 100 includes a display and may display image content, video content, game content, graphic content, etc. The display device 100 may output or display an image received from the electronic device 200. Examples of the display device 100 may include, for example, and without limitation, various electronic devices capable of receiving and outputting content, such as a network TV, a smart TV, an Internet TV, a web TV, an IPTV, and a PC. The display device 100 may be referred to as a display device because it receives and displays content, and may also be referred to as a content receiving device, a sync device, an electronic device, or a computing device.

The display device 100 may include an input/output unit (e.g., including input/output circuitry) 110, a communication unit (e.g., including communication circuitry) 120, a video processing unit (e.g., including video processing circuitry) 130, a display 140, an audio processing unit (e.g., including audio processing circuitry) 150, an audio output unit (e.g., including audio output circuitry) 160, a memory 170, and a controller (e.g., including various processing and/or control circuitry) 180.

The input/output unit 110 may include various input/output circuitry and receive an image signal and/or an audio signal from the electronic device 200 under the control of the controller 180 according to a connected protocol.

The communication unit 120 may include one or more modules including various communication circuitry that enable wireless communication between the display device 100 and a wireless communication system or between the display device 100 and a network in which another electronic device is located.

The communication unit 120 may receive an image signal and/or an audio signal received from the electronic device 200 under the control of the controller 180 according to a wireless communication protocol.

The communication unit 120 may be connected to the server computer 300 under the control of the controller 180 to transmit a request to the server computer 300 and receive a response to the request from the server computer 300.

The video processing unit 130 may include various video processing circuitry and process an image signal received from the input/output unit 110 or the communication unit 120 and may output the image signal to the display 140 under the control of the controller 180.

The display 140 may display the image signal received from the video processing unit 130 on a screen.

The audio processing unit 150 may include various audio processing circuitry and convert an audio signal received from the input/output unit 110 or the communication unit 120 into an analog audio signal and may output the analog audio signal to the audio output unit 160 under the control of the controller 180.

The audio output unit 160 may output the received analog audio signal through a speaker.

The memory 170 may store a program related to an operation of the display device 100 and various data generated during the operation of the display device 100.

According to an embodiment, the memory 170 may store one or more instructions for performing a function of the display device 100 of the present disclosure, that is, a function of detecting an execution start time of content by analyzing an image screen received from the electronic device 200, obtaining attribute information of the executed content by analyzing the image screen for which the execution start time of the content is detected, and controlling a content execution environment based on the obtained attribute information of the content.

The controller 180 may include various processing and/or control circuitry and control an overall operation of the display device 100 by executing the one or more instructions stored in the memory 170. Details of the function, structure and operation of the processor(s) described below are equally applicable to the controller 180.

According to an embodiment, the controller 180 may execute the one or more instructions stored in the memory 170 to display an image screen received from an electronic device connected to the display device 100, determine whether execution of content starts by analyzing the displayed image screen using a first neural network model, call a second neural network model when it is determined that the execution of the content starts, obtain attribute information of the content by analyzing the image screen of the content using the second neural network model, and to control an execution environment of the content based on the obtained attribute information.

According to an embodiment, the controller 180 may execute the one or more instructions stored in the memory 170 to identify an electronic device from HDMI consumer electronics control (CEC) received through HDMI communication from the electronic device and obtain the first neural network model trained corresponding to the identified electronic device. According to an embodiment, the first neural network model may include a model trained to receive a plurality of user interface (UI) screens, which may be received from the electronic device, as training data and classify the plurality of UI screens into a content-executable UI screen and a content-inexecutable UI screen.

According to an embodiment, the controller 180 may execute the one or more instructions stored in the memory 170 to determine whether switching occurs from the content-executable UI screen to the content-inexecutable UI screen by inputting the displayed image screen to the first neural network model and analyzing the image screen and determine that execution of the content starts when it is determined that switching occurs from the content-executable UI screen to the content-inexecutable UI screen. According to an embodiment, the second neural network model may include a model trained to receive a plurality of image screens as training data and detect a text area or a logo area from the plurality of image screens.

According to an embodiment, the controller 180 may execute the one or more instructions stored in the memory 170 to extract the text area or the logo area from the image screen by inputting the image screen to the second neural network model and analyzing the image screen and obtain attribute information of the content based on the text area or the logo area.

According to an embodiment, the controller 180 may execute the one or more instructions stored in the memory 170 to transmit text extracted from the text area or the logo area to a server and obtain attribute information of the content by receiving attribute information of the content related to the text area or the logo area from the server.

According to an embodiment, the controller 180 may execute the one or more instructions stored in the memory 170 to control an execution environment of the content by controlling at least one of image quality setting, sound setting, viewing age restriction setting, and display device environment setting suitable for the content based on the obtained attribute information.

According to an embodiment, the controller 180 may execute the one or more instructions stored in the memory 170 to determine whether the execution of the content ends after the controlling of the execution environment of the content and determine whether execution of new content starts by analyzing an image screen using the first neural network model when it is determined that the execution of the content ends.

The server computer 300 may receive a request from the display device 100 and may provide a response to the received request.

The server computer 300 may include a communication unit (e.g., including communication circuitry) 310, a memory 320, and a controller (e.g., including various processing and/or control circuitry) 330.

The communication unit 310 may include various communication circuitry and communicate with the display device using a wired/wires communication method.

The memory 320 may include data processed by the controller 330 and applications used for processing by the controller 330.

According to an embodiment, the memory 320 may store one or more programs for performing text recognition or image recognition.

According to an embodiment, the memory 320 may include a database in which attribute information of content is stored.

The controller 330 may include various processing and/or control circuitry and generally control elements of the server computer 300. Also, the controller 330 may execute instructions stored in the memory 320 to execute the applications.

Details of the function, structure and operation of the processor(s) described below are equally applicable to the controller 330.

According to an embodiment, the controller 330 may receive data such as text, a text area, or a logo image extracted from an image screen from the display device 100 and may obtain text or an image corresponding to the image screen by performing text recognition or image recognition based on the received data.

According to an embodiment, the controller 330 may search for attribute information of content corresponding to the obtained text or image in a content attribute storage database and may obtain content attribute information corresponding to the text, the text area, or the logo image received from the display device 100. The content attribute information may include various metadata for the content, such as a category, a genre, or viewing age information of the content.

Figure 3:
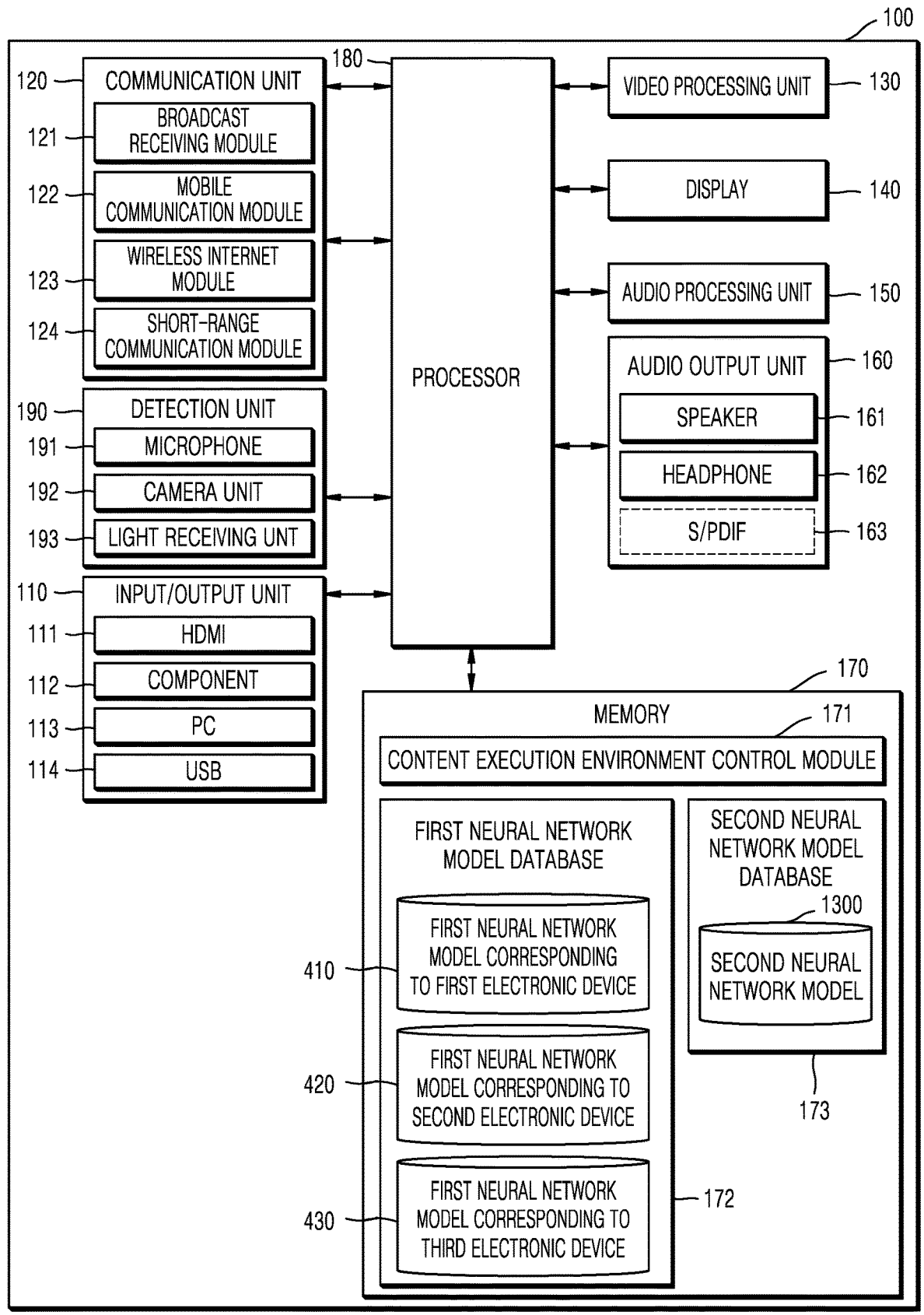
FIG. 3 is a block diagram illustrating an example configuration of a display device, according to various embodiments.

FIG. 3 is a block diagram illustrating an example configuration of a display device, according to various embodiments.

Referring to FIG. 3, the display device 100 may include the input/output unit (e.g., including input/output circuitry) 110, the communication unit (e.g., including communication circuitry) 120, the video processing unit (e.g., including video processing circuitry) 130, the display 140, the audio processing unit (e.g., including audio processing circuitry) 150, the audio output unit (e.g., including audio output circuitry) 160, the memory 170, a processor (e.g., including processing circuitry) 180, and a detection unit (e.g., including detecting circuitry) 190.

The input/output unit 110 may include various input/output circuitry and receive a video (e.g., a moving image), an audio (e.g., voice or music), and additional information (e.g., EPG) from the outside of the display device 100 under the control of the controller 180. The input/output unit 110 may include a high-definition multimedia interface (HDMI) port, a component jack, a PC port, a universal serial bus (USB) port, or a combination thereof. The input/output unit 110 may further include a display port (DP), a thunderbolt, and a mobile high-definition link (MHL) in addition to the HDMI port.

The communication unit 120 may include one or more modules including various communication circuitry that enable wireless communication between the display device 100 and a wireless communication system or between the display device 100 and a network in which another electronic device is located. For example, the communication unit 120 may include a broadcast receiving module 121, a mobile communication module 122, a wireless Internet module 123, and a short-range communication module 124.

The broadcast receiving module 121 may include a module including various circuitry for receiving a broadcast signal.

The mobile communication module 122 may include various circuitry that transmits and receives a wireless signal to and from at least one of a base station, an external terminal, and a server on a mobile communication network. The wireless signal may include a voice call signal, a video call signal, or various types of data according to text/multimedia message transmission/reception.

The wireless Internet module 123 refers to a module including various circuitry for wireless Internet access and may be internally or externally coupled to a device. Examples of wireless Internet technology may include wireless local area network (WLAN) (Wi-Fi), wireless broadband (Wibro), world interoperability for microwave access (Wimax), and high speed downlink packet access (HSDPA). Through the wireless Internet module, the device may establish a Wi-Fi peer to peer (P2P) connection with other devices.

The short-range communication module 124 refers to a module including various circuitry for short-range communication. Examples of short-range communication technology may include Bluetooth, Bluetooth low energy (BLE), radio frequency identification (RFID), infrared data association (IrDA), ultra-wideband (UWB), and Zigbee.

The video processing unit 130, the display 140, and the audio processing unit 150 are the same as those described with reference to FIG. 2.

The audio output unit 160 may include various audio output circuitry and output an audio (e.g., voice or sound) input through the communication unit 120 or the input/output unit 110. Also, the audio output unit 165 may output an audio stored in the memory 170 under the control of the controller 180. The audio output unit 160 may include at least one of a speaker 161, a headphone output terminal 162, or a Sony/Phillips digital interface (S/PDIF) output terminal 163, or a combination thereof.

The detection unit 190 may include various circuitry and detect a user's voice, image, or interaction, and may include a microphone 191, a camera unit 192, and a light receiving unit 193.

The microphone 191 receives a voice uttered by the user. The microphone 191 may convert the received voice into an electrical signal and may output the electrical signal to the controller 180. The user's voice may include a voice corresponding to a menu or a function of the display device 100.

The camera unit 192 may include a camera and receive an image (e.g., consecutive frames) corresponding to a motion of the user including a gesture within a camera recognition range. The controller 180 may select a menu displayed on the display device 100 using a recognition result of the received motion or may perform control corresponding to the motion recognition result.

The light receiving unit 193 receives an optical signal (including a control signal) received from an external control device. The light receiving unit 193 may receive an optical signal corresponding to a user input (e.g., a touch, a press, a touch gesture, a voice, or a motion) from the control device. A control signal may be extracted from the received optical signal under the control of the controller 180.

According to an embodiment, the memory 170 may include a content execution environment control module (e.g., including various executable program instructions) 171, a first neural network model database 172, and a second neural network model database 173.

The content execution environment control module 171 may include one or more instructions for managing and controlling environment information of the display device 100 to suit content displayed on the display 130. The content execution environment control module 171 may include one or more instructions for detecting an execution start time of content by analyzing an image screen received from the electronic device 200, obtaining attribute information of the content by analyzing the image screen after the execution start time of the content, and controlling an execution environment of the content based on the obtained attribute information of the content, with reference to the first neural network model database 172 and the second neural network model database 173. When a 'content execution environment is controlled', it refer, for example, tot, when the display device 100 displays an image screen received from the electronic device 200, a setting environment of the display device 100 being controlled to provide a better experience to a user according to characteristics of the image screen displayed on the display device 100. Although content is actually executed by the electronic device 200 and the display device 100 receives and displays a content execution screen from the electronic device 200, controlling setting information according to the execution screen in the display device 100 will be referred to as "content execution environment control" for convenience of explanation.

The first neural network model database 172 may include a plurality of first neural network models used to determine whether execution of content starts by analyzing an image received from the electronic device 200. When a plurality of different electronic devices are connected to the display device 100, because each of the plurality of different electronic devices uses a user interface screen dedicated thereto, it may be preferable that a first neural network model is trained to correspond to each electronic device. Accordingly, the first neural network model database 172 may include a plurality of first neural network models trained to respectively correspond to the plurality of electronic devices. In FIG. 3, the first neural network model database 172 may include a first neural network model 410 trained using a user interface screen of a first electronic device, a first neural network model 420 trained using a user interface screen of a second electronic device, and a first neural network model 430 trained using a user interface screen of a third electronic device. For example, for a first game console device, a first neural network model corresponding to the first game console device may be obtained by training a first neural network model using user interface screens output from the first game console device, and for a second game console device, a first neural network model corresponding to the second game console device may be obtained by training a first neural network model using user interface screens output from the second game console device.

A second neural network model 1300 may be a neural network model used to obtain attribute information of content by analyzing an image received from the electronic device 200.

As such, a neural network model included in the first neural network model database 172 may be stored in a memory when the display device 100 is manufactured or may be downloaded and stored from a server after the display device 100 is manufactured. Also, such a neural network model may be updated through the server periodically or aperiodically.

Although the memory 170 stores the first neural network model database 172 and the second neural network model database 173 in the display device 100 of FIG. 3, the first neural network model database 172 and the second neural network model database 173 do not necessarily need to be stored in the display device 100. The first neural network model database 172 and the second neural network model database 173 may exist in a server computer, and the display device 100 may transmit a query for referring to the first neural network model or a query for referring to the second neural network model to the server computer and may receive a response to the query from the server computer.

The processor 180 (in addition to the controllers 180, 240 and 320 above) according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

Figure 4A:
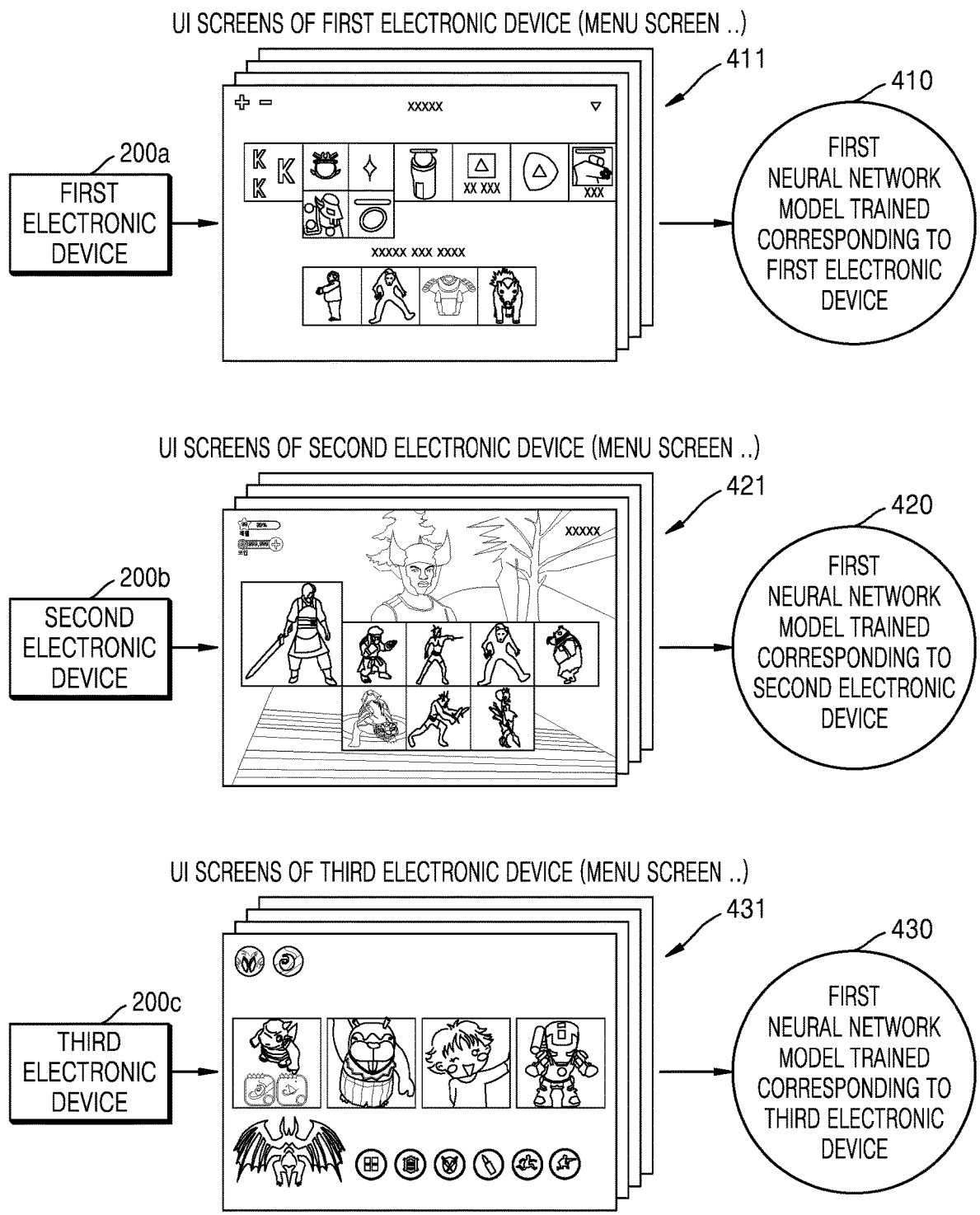
FIG. 4A is a diagram illustrating an example method of training a first neural network model corresponding to each electronic device, according to various embodiments.

FIG. 4A is a diagram illustrating an example method of training a first neural network model corresponding to each electronic device, according to various embodiments.

A plurality of different electronic devices may be connected to the display device 100, and the display device 100 may receive and display an image each of the plurality of different electronic devices.

Each electronic device may use a user interface environment provided by the electronic device itself. For example, referring to FIG. 4A, a format of a main screen 411 provided by a first electronic device 200a, a format of a main screen 421 provided by a second electronic device 200b, and a format of a main screen 431 provided by a third electronic device 200c may be different from each other. As such, because UI screens provided by the electronic devices are different from each other, when a certain electronic device is connected to the display device 100, the display device 100 may obtain a more accurate result by analyzing an image received from the certain electronic device using a neural network model trained using a UI screen provided by the certain electronic device connected to the display device 100.

Accordingly, a first neural network model corresponding to the first electronic device 200a may be obtained by being trained using the UI screens 411 provided by the first electronic device 200 as training data. Likewise, a second neural network model 420 corresponding to the second electronic device 200b may be obtained by being trained using the UI screens 421 provided by the second electronic device 200 as training data. Also, a third neural network model 430 corresponding to the third electronic device 200c may be obtained by being trained using the UI screens 431 provided by the third electronic device 200c as training data.

Figure 4B:
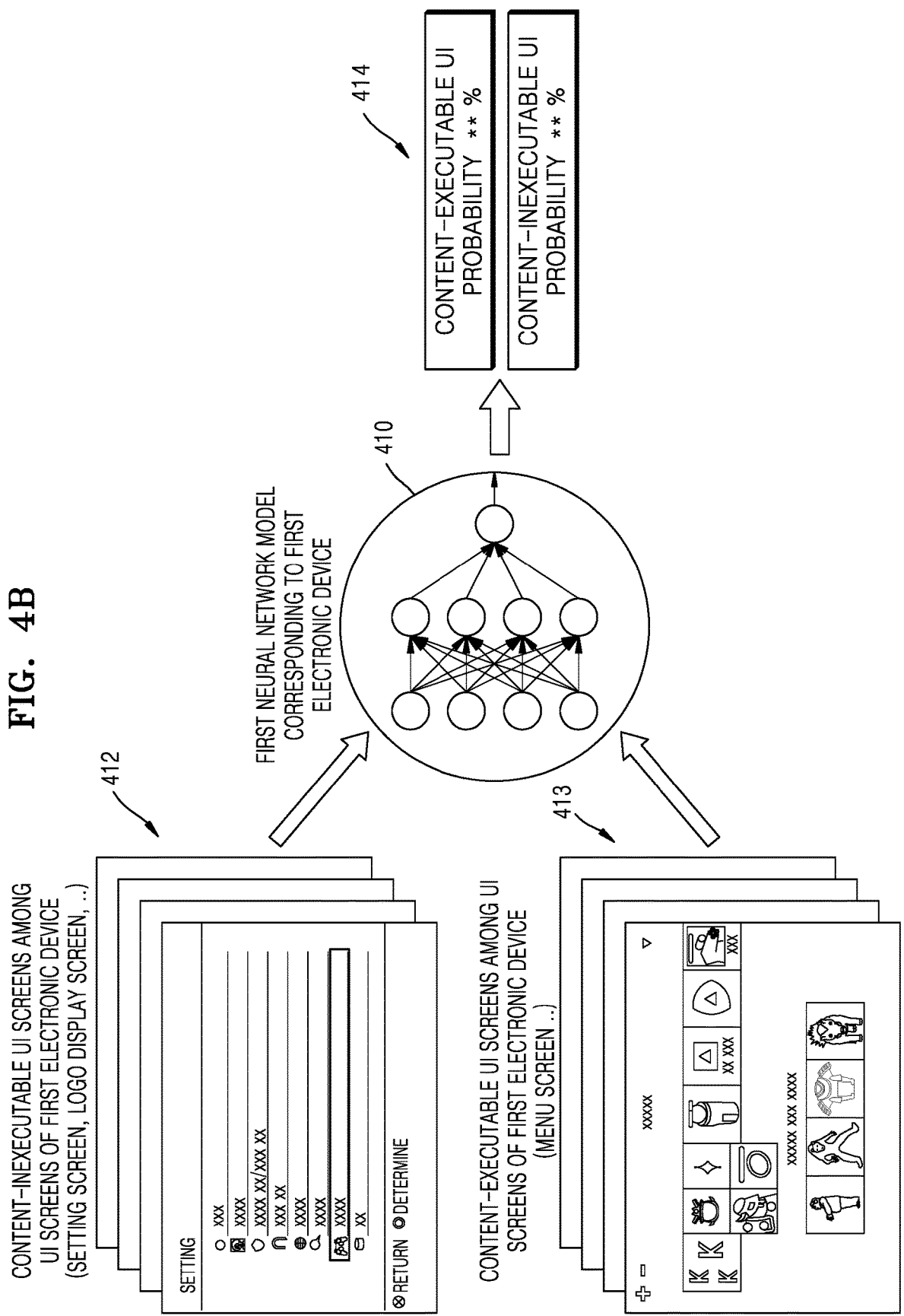
FIG. 4B is a diagram illustrating an example method of obtaining a first neural network model corresponding to a first electronic device, according to various embodiments.

FIG. 4B is a diagram illustrating an example method of obtaining a first neural network model corresponding to a first electronic device, according to various embodiments.

Referring to FIG. 4B, a neural network model 410 corresponding to a first electronic device may be obtained by being trained using UI screens provided by the first electronic device. In detail, the neural network model 410 corresponding to the first electronic device may be obtained by being trained by classifying UI screens provided by the first electronic device into content-inexecutable UI screens 412 and content-executable UI screens 413.

The first electronic device may provide various UI screens to execute content. For example, the first electronic device may provide a setting UI screen for changing settings of the first electronic device, a menu UI screen for displaying and selecting items of content-executable on the first electronic device, a screen for displaying a logo of the first electronic device, a logo screen of a selected content producer, and a selected content logo screen. From among the screens, the setting UI screen or the logo display screen from among the screens may not be manipulated to execute content, and thus, may be classified as the content-inexecutable UI screen 412, and the menu UI screen may be manipulated to execute content, and thus, may be classified as the content-executable UI screen 413.

The neural network model corresponding to the first electronic device may be trained by receiving UI screens tagged as the content-executable UI screen 413 and UI screens tagged as the content-inexecutable UI screen 412 from among the UI screens provided by the first electronic device, and may output at least one of a probability of being the content-executable UI screen or a probability of being the content-inexecutable UI screen as a result 414.

FIG. 4B illustrates the neural network model corresponding to the first electronic device. Because each electronic device will have unique UI screens used by each electronic device, it may be preferable to train a neural network model for determining whether a screen is a content-executable UI screen or a content-inexecutable UI screen for each electronic device. Accordingly, a neural network model corresponding to a second electronic device may be trained by receiving UI screens tagged as a content-executable UI screen and UI screens tagged as a content-inexecutable UI screen from among UI screens provided by the second electronic device, and may output at least one of a probability of being the content-executable UI screen or a probability of being the content-inexecutable UI screen as a result.

A neural network model trained by receiving tagged UI screens to output a category of the received UI screens as a result may use a deep neural network (DNN) or the like.

Figure 5:
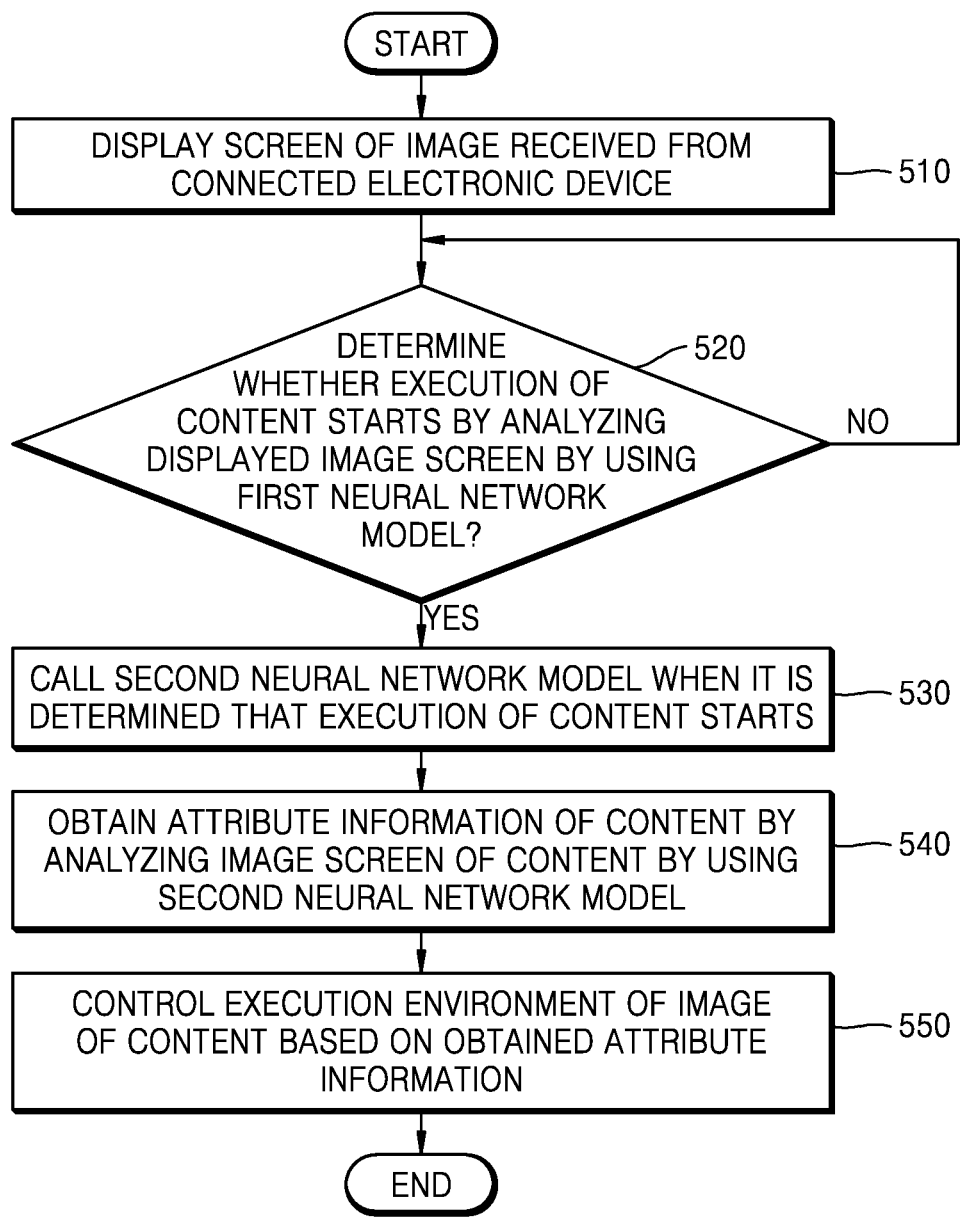
FIG. 5 is a flowchart illustrating an example method of operating a display device, according to various embodiments.

FIG. 5 is a flowchart illustrating an example method of operating a display device, according to various embodiments.

Referring to FIG. 5, in operation 510, the display device 100 may display an image screen received from an electronic device connected to the display device 100.

The display device 100 may be connected by wire or wirelessly to the electronic device 200 and then may receive an image screen and display the received image screen. Examples of the image screen received by the display device 100 from the electronic device 200 may include a setting UI screen, a menu UI screen, a logo display screen, and an actual content image screen.

In operation 520, the display device 100 may determine whether execution of content starts by analyzing the displayed image screen using a first neural network model.

The first neural network model may be a neural network model trained to receive and analyze the displayed image screen and determine whether the received screen is a content-executable UI screen or a content-inexecutable UI screen. For example, the first neural network model may receive and analyze the image screen and may determine whether the received screen is a content-executable UI screen or a content-inexecutable UI screen by outputting at least one of a probability that the received screen is a content-executable UI screen or a probability that the received screen is a content-inexecutable UI screen. For example, when the first neural network model analyzes the image screen and finds that a probability that the image screen is a content-executable UI screen is 90% or more, the first neural network model may determine that the image screen is a content-executable UI screen.

The display device 100 may determine that execution of content starts when the displayed image screen switches from a content-executable UI screen to a content-inexecutable UI screen. For example, the display device 100 may determine that execution of content starts when a result of image analysis through the first neural network model switches from a content-executable UI screen to a content-inexecutable UI screen.

According to an embodiment, the display device 100 may determine whether execution of content starts by analyzing the displayed image screen using the first neural network model trained corresponding to the electronic device 200 connected to the display device 100.

In operation 520, when it is not determined that execution of content starts as a result of determining whether execution of content starts by analyzing the displayed image screen, the display device 100 may continuously analyze the image screen.

In operation 520, when it is determined that execution of content starts as a result of determining whether execution of content starts by analyzing the displayed image screen, the display device 100 may proceed to operation 530.

In operation 530, the display device 100 may call a second neural network model as it is determined that the execution of the content starts.

The second neural network model may be a neural network model trained to receive and analyze the image screen and extract a text area or a logo area using which attribute information of the content from the received screen may be derived.

In operation 540, the display device 100 may obtain attribute information of the content by analyzing the image screen using the second neural network model.

According to an embodiment, the display device 100 may obtain text or a logo from the text area or the logo area of the image screen using the second neural network model and may obtain attribute information of the content using the obtained text or logo.

According to an embodiment, the display device 100 may transmit the text or the logo extracted from the text area or the logo area of the image screen using the second neural network model to a server and may obtain attribute information of the content matching the text or the logo from the server. The attribute information of the content may include metadata including a title of the content and a category of the content.

In operation 550, the display device 100 may control an execution environment of the image of the content based on the obtained attribute information of the content.

According to an embodiment, the display device 100 may set image quality suitable for the content, may set sound suitable for the count, or may provide a viewing age restriction service suitable for the content based on the attribute information of the content.

Figure 6:
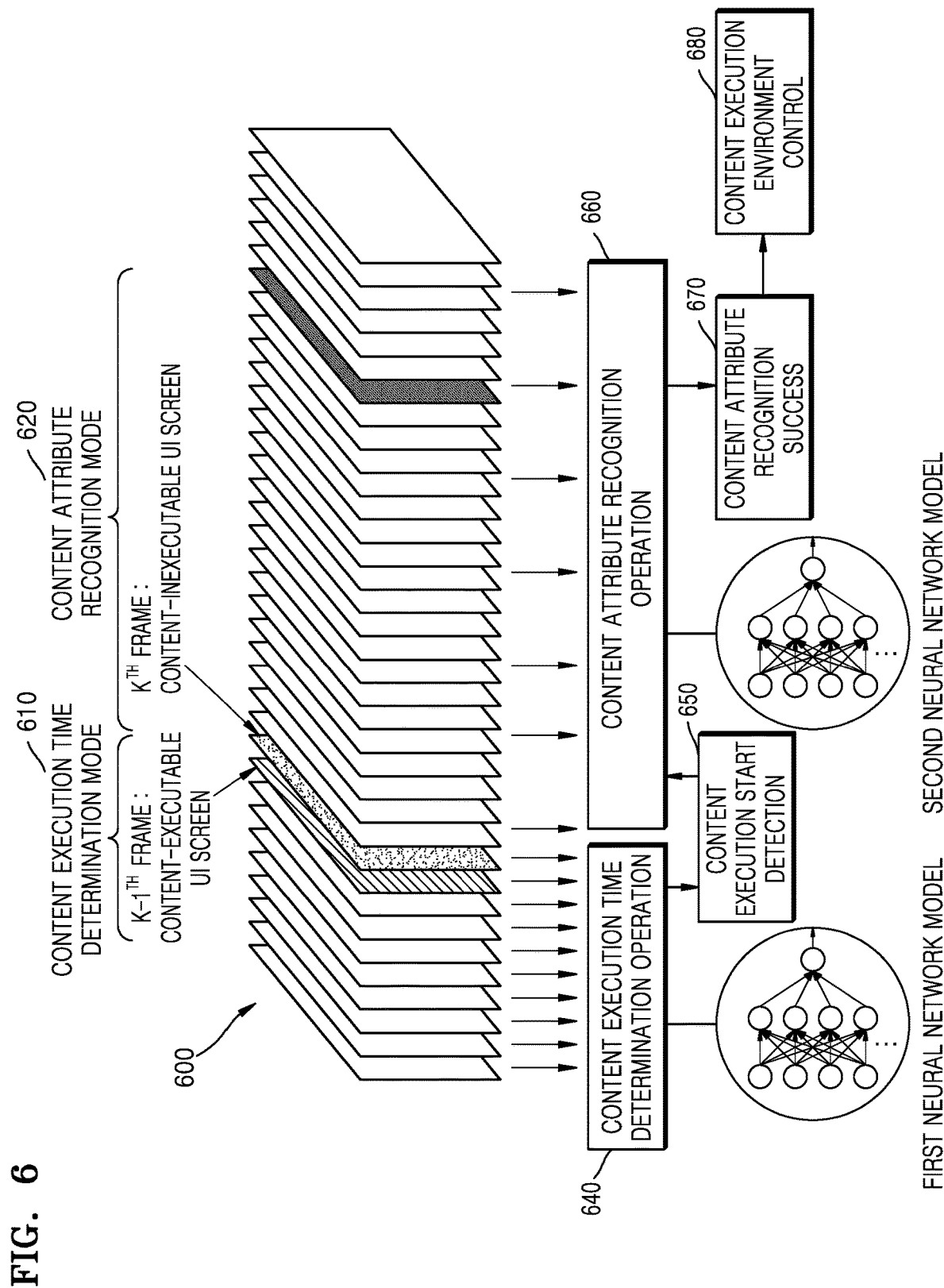
FIG. 6 is a diagram illustrating the method of FIG. 5, according to various embodiments.

FIG. 6 is a diagram illustrating the example method of FIG. 5, according to various embodiments.

Referring to FIG. 6, when the electronic device 200 is connected to the display device 100, the display device 100 may receive, from the electronic device 200, an image 600 output from the electronic device 200. The display device 100 may receive the image 600 in units of frames.

When the display device 100 receives the image in units of frames from the electronic device 200 connected to the display device 100, the display device 100 may analyze the received image and may operate in a content execution time determination mode 610 until detecting that execution of content starts.

In the content execution time determination mode 610, the display device 100 may perform a content execution time determination operation 640 using a first neural network model. For example, when it is determined that a $k-1^{th}$ frame is a content-executable UI screen and a $k^{th}$ frame is a content-inexecutable UI screen as a result of inputting the received image frames to the first neural network model and analyzing the image frames, the display device 100 may detect (650) that execution of content starts. The display device 100 may analyze the frames received from the electronic device 200 by sampling the frames every frame or at regular time intervals, for example, 100 ms intervals, until a content execution time is detected.

When it is detected that execution of content starts (650), the display device 100 may perform a content attribute recognition operation 660 by calling a second neural network model without using the first neural network model. The display device 100 may maintain a content attribute recognition mode 620 in which the content attribute recognition operation 660 is performed using the second neural network model until content attribute recognition succeeds. The display device 100 may analyze the frames received from the electronic device 200 by sampling the frames at regular intervals until content attribute recognition succeeds.

In the content attribute recognition mode 620, the display device 100 may detect a text area or a logo area from the image screen using the second neural network model and may obtain content attribute information based on text or a logo extracted from the detected text area or logo area. The display device 100 may control (680) an execution environment of the content based on attribute of the content when content attribute recognition succeeds (670) by analyzing the image using the second neural network model.

An operation of a display device according to the present disclosure will be described in greater detail below with reference to FIGS. 7 to 16.

Figure 7:
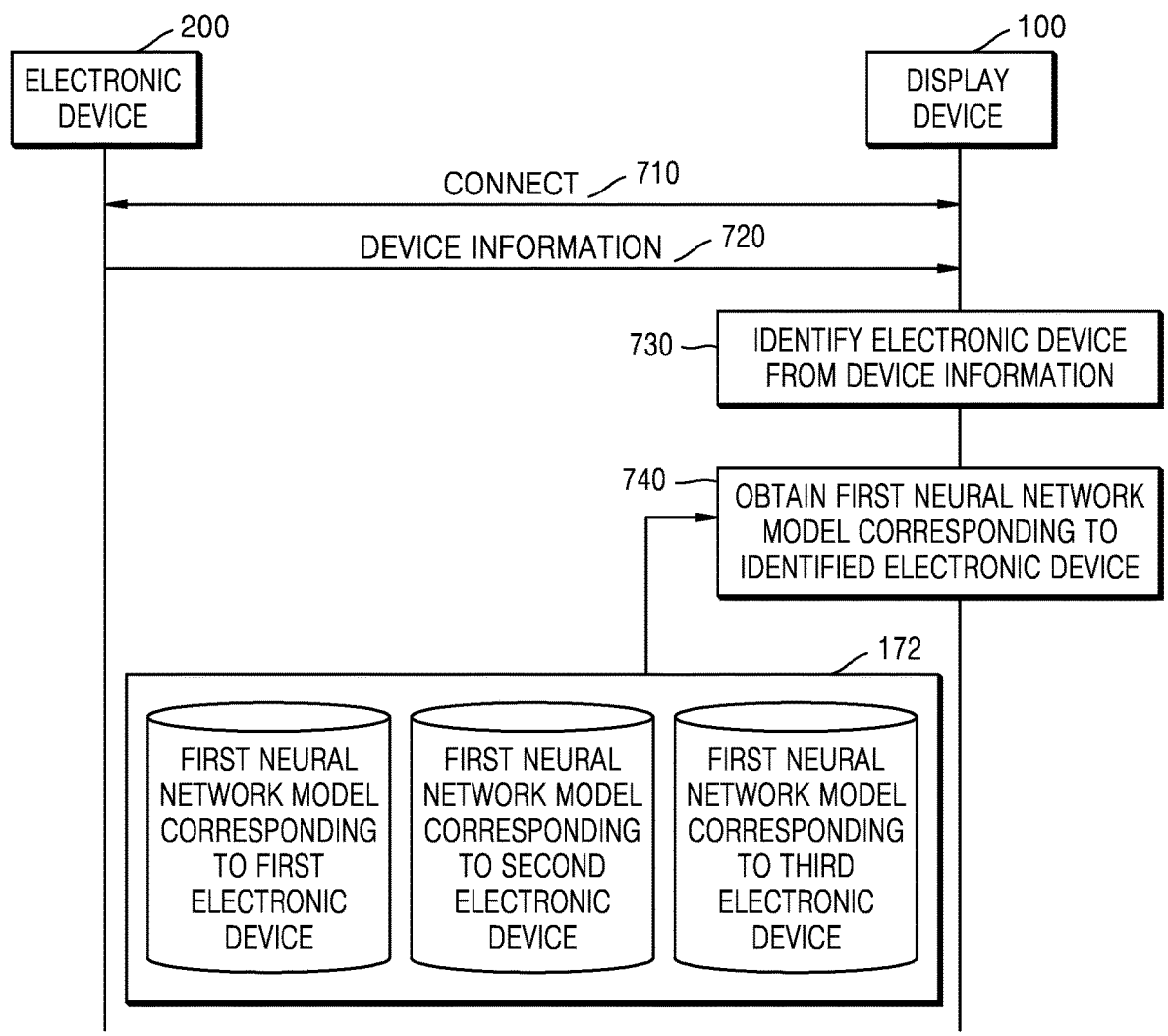
FIG. 7 is a signal flow diagram illustrating an example method in which a display device obtains a first neural network model, according to various embodiments.

FIG. 7 is a signal flow diagram illustrating an example method in which a display device obtains a first neural network model, according to various embodiments.

Referring to FIG. 7, in operation 710, the electronic device 200 and the display device 100 may be connected to each other.

According to an embodiment, the display device 100 and the electronic device 200 may be connected to each other through wired communication. For example, the display device 100 and the electronic device 200 may be connected to each other through an HDMI cable, and in this case, the input/output unit 110 of the display device 100 and the input/output unit 210 of the electronic device 100 may communicate with each other according to an HDMI communication protocol.

According to an embodiment, the display device 100 and the electronic device 200 may be connected to other through wireless communication. For example, the display device 100 and the electronic device 200 may be connected to each other through wireless communication such as Bluetooth, BLE, Zigbee, or Wi-Fi, and in this case, the display device 100 and the electronic device 200 may communicate according to each communication protocol.

In operation 720, the display device 100 may receive device information of the electronic device 200 from the electronic device 200.

According to an embodiment, when the display device 100 and the electronic device 200 are connected to each other through an HDMI cable, the display device 100 may receive device information about the electronic device 200 using HDMI CEC or an HDMI Info frame. In this case, the device information may include at least one of, but not limited to, a device type, a manufacturer, a business name, and a model name of the electronic device 200.

According to an embodiment, when the display device 100 and the electronic device 200 are connected to each other through wireless communication, the display device 100 may receive device information about the electronic device 200 according to a connected wireless communication protocol. In this case, the device information may include at least one of, but not limited to, a device type, a manufacturer, a business name, and a model name of the electronic device 200.

In operation 730, the display device 100 may identify the electronic device 200 from the device information received from the electronic device 200.

In operation 740, the display device 100 may obtain a first neural network model corresponding to the identified electronic device 200. As described above with reference to FIG. 3, the display device 100 may include the first neural network model database 172 including a first neural network model trained for each of one or more electronic devices that may be connected to the display device 100. The display device 100 may obtain a neural network model corresponding to the identified electronic device from the first neural network model database 172. For example, when the electronic device is identified as a first electronic device, the display device 100 may obtain a first neural network model corresponding to the first electronic device.

Figure 8:
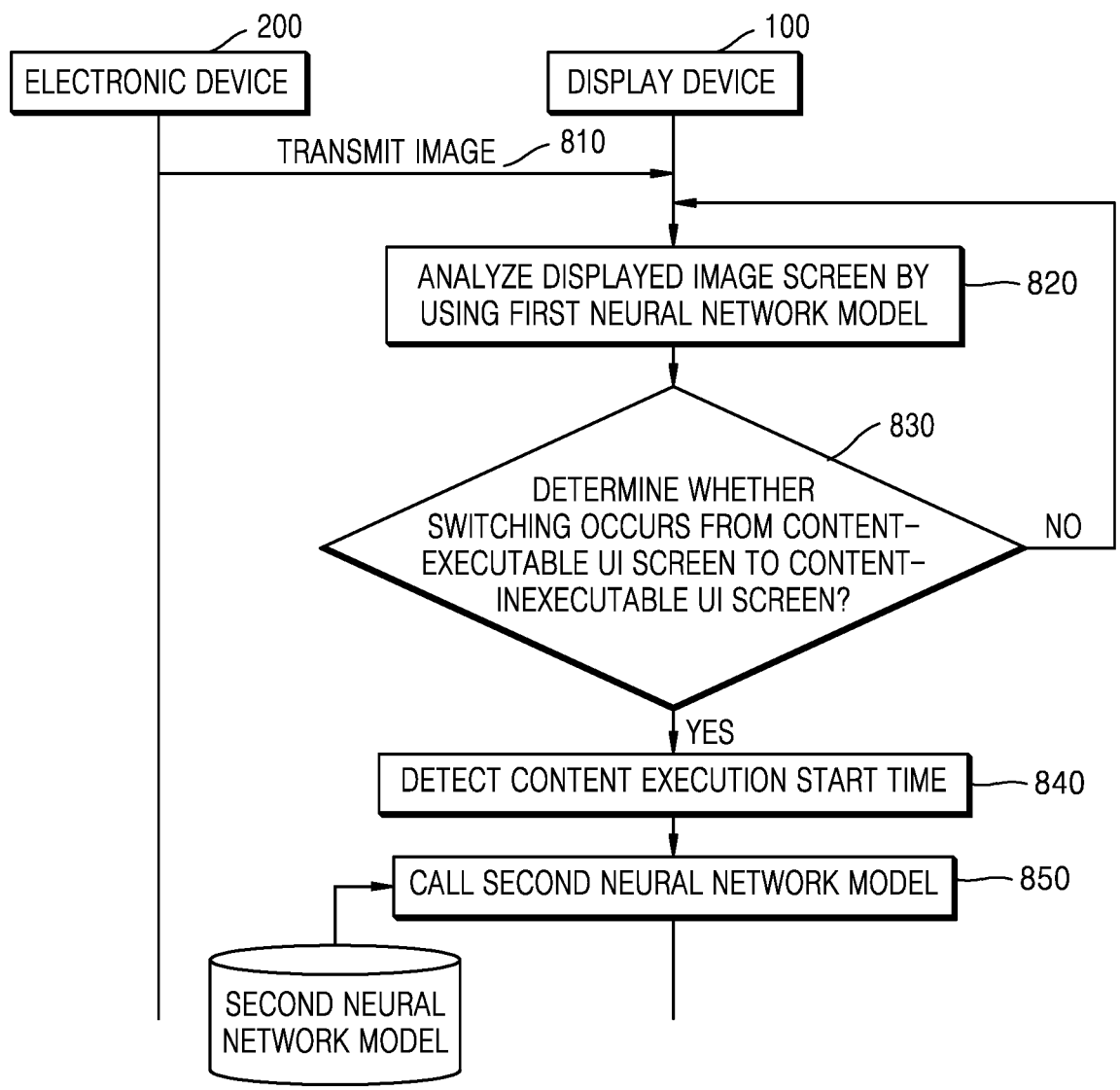
FIG. 8 is a flowchart illustrating an example method in which a display device 100 detects a content execution start time, according to various embodiments.

FIG. 8 is a is a signal flow diagram illustrating an example method in which the display device 100 detects a content execution start time, according to various embodiments. An operation of FIG. 8 may be performed after an operation of FIG. 7.

Referring to FIG. 8, in operation 810, after the display device 100 and the electronic device 200 are connected to each other, the electronic device 200 may transmit an image to the display device 100.

In operation 820, the display device 100 may display the image received from the electronic device 200 on a screen and may analyze the displayed image screen using a first neural network model. The first neural network model may be obtained through, for example, the operation of FIG. 7.

In operation 830, the display device 100 may determine whether switching occurs from a content-executable UI screen to a content-inexecutable UI screen according to image screen analysis.

When analyzing the image received from the electronic device 200 in units of frames, the display device 100 may input the received image frame to the first neural network model and may determine whether the input image frame is a content-executable UI screen or a content-inexecutable UI screen. The display device 100 may determine whether the image screen switches from a content-executable UI screen to a content-inexecutable UI screen using a result output from the first neural network model. When a content-executable UI screen is output and then a content-inexecutable UI screen is output, it may be determined that a user selects some content in the content-executable UI screen and thus the content is executed, that is, execution of content starts.

Figure 9:
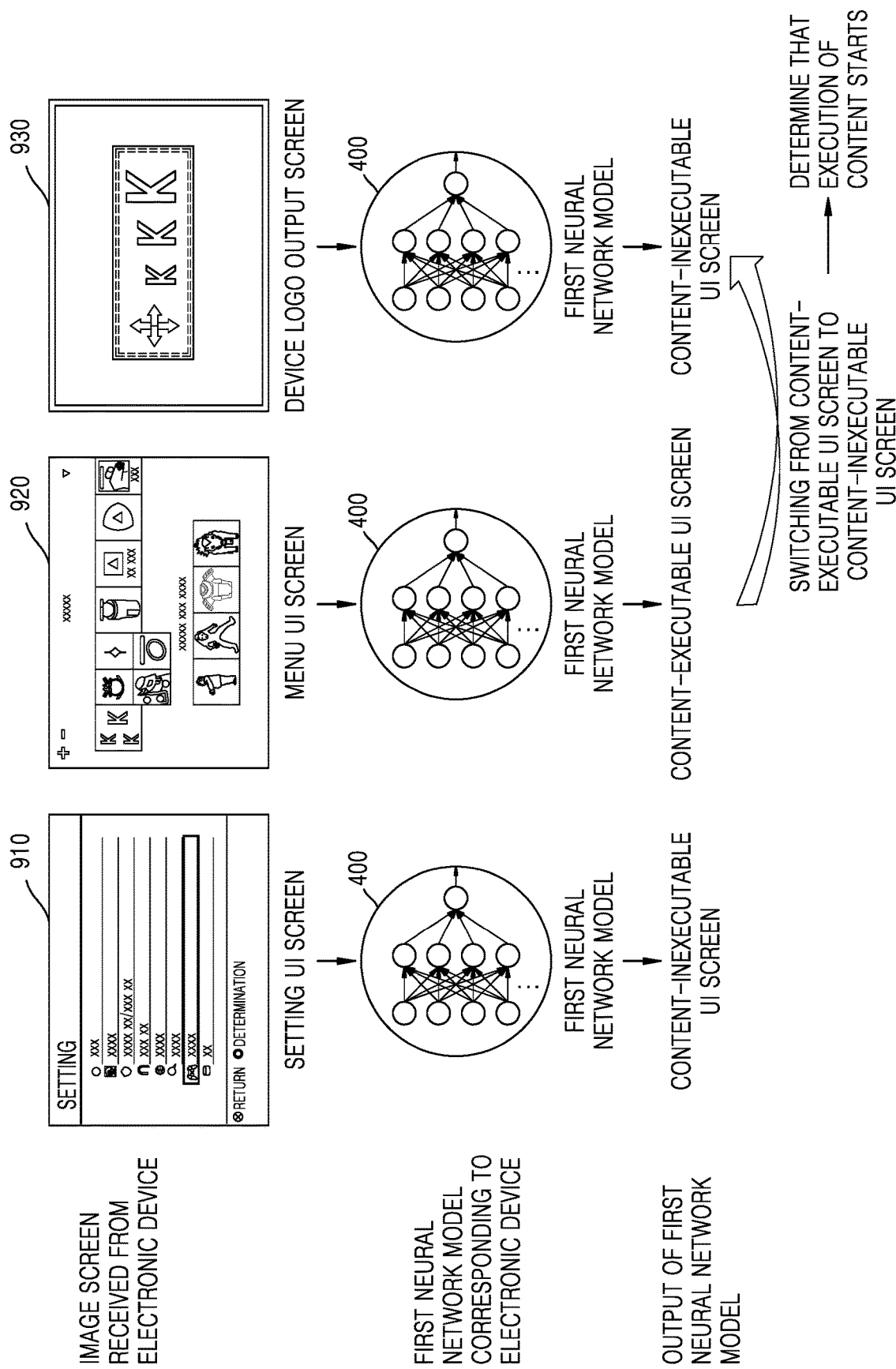
FIG. 9 is a diagram illustrating an example method of determining a content execution time, according to various embodiments.

FIG. 9 is a diagram illustrating an example method of determining a content execution time, according to various embodiments.

Referring to FIG. 9, it is assumed that the display device 100 sequentially receives image screens, that is, a setting UI screen 910, a menu UI screen 920, and a device logo display screen 930, from the electronic device 200 connected to the display device 100.

The display device 100 may input the setting UI screen 910 received from the electronic device 200 to a first neural network model 400 corresponding to the electronic device 200 and may obtain a result indicating that the input screen is a content-inexecutable UI screen. Next, the display device 100 may input the menu UI screen 920 next to the first neural network model 400 corresponding to the electronic device 200 and may obtain a result indicating that the input screen is a content-executable UI screen. In this case, because switching from the setting UI screen 910 to the menu UI screen 920 is switching from a content-inexecutable UI screen to a content-executable UI screen, it may be determined that a condition of operation 830 is not satisfied.

The display device 100 may input the device logo output screen 930 to the first neural network model 400 corresponding to the electronic device 200 and may obtain a result indicating that the input screen is a content-inexecutable UI screen. In this case, because switching from the menu UI screen 920 to the device logo output screen 930 is switching from a content-executable UI screen to a content-inexecutable UI screen, it may be determined that the condition of operation 830 is satisfied.

Referring back to FIG. 8, when it is not determined in operation 830 that switching occurs from a content-executable UI screen to a content-inexecutable UI screen, the display device 100 may proceed to operation 820 to analyze an image received from the electronic device 200.

When it is determined in operation 830 that switching occurs from a content-executable UI screen to a content-inexecutable UI screen, operation 840 may be performed.

In operation 840, the display device 100 may determine that a content execution start time is detected.

In operation 850, the display device 100 may call a second neural network to recognize the executed content according to the detection of the content execution start time. The second neural network may be a neural network trained to detect a text area or a logo area by analyzing the image screen.

Figure 10:
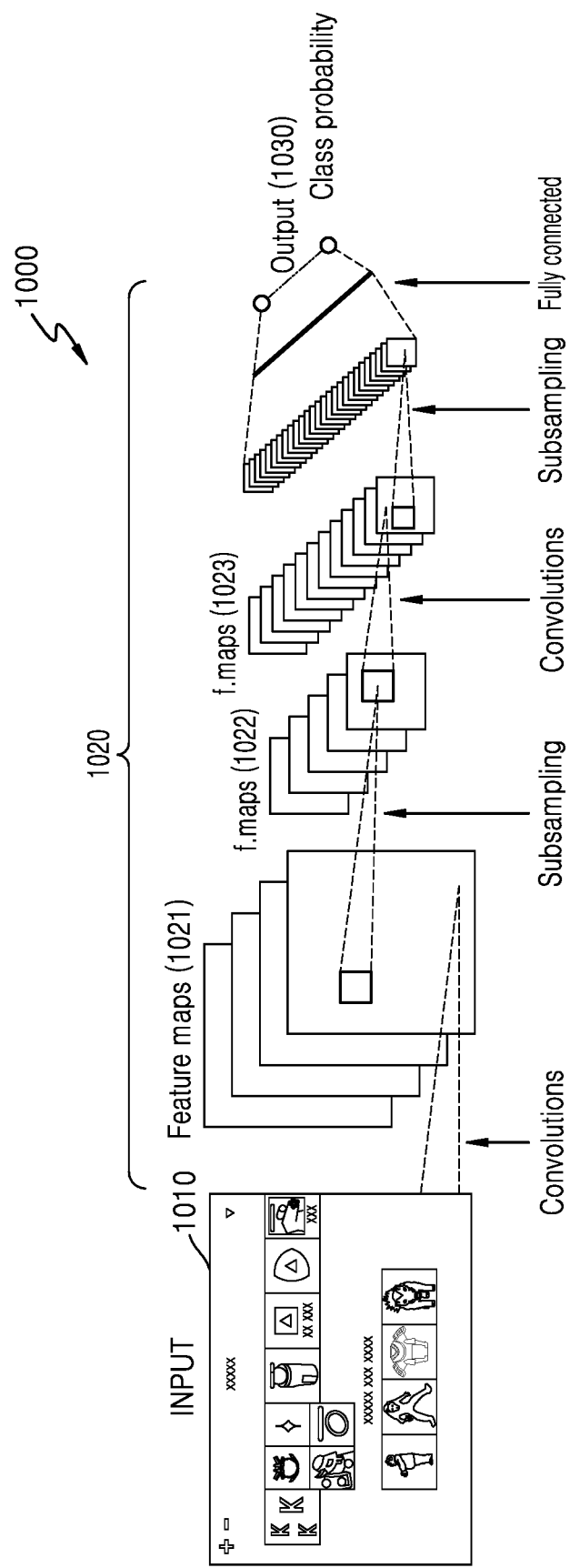
FIG. 10 is a diagram illustrating an example of a neural network model for classifying image screens, according to various embodiments.

FIG. 10 is a diagram illustrating an example of a neural network model for classifying image screens, according to various embodiments.

A deep neural network may be trained through training data. The trained deep neural network may perform an inference operation that is an operation for objection recognition. The deep neural network may be designed in various ways according to a model implementation method (e.g., a convolutional neural network (CNN), the accuracy of a result, the reliability of a result, the computational processing speed and capacity of a processor, a capacity, etc.

FIG. 10 is a diagram illustrating an example structure of a CNN, according to various embodiments.

Referring to FIG. 10, a CNN 1000 has a structure in which an input image 1010 is input and passes through N convolutional layers 1020, and output data 1030 is output. In this case, the CNN 1000 may be a deep CNN including two or more convolutional layers.

The display device 100 according to an embodiment may extract "features" such as a border, a line, and a color from the input image using the CNN 1000. Each of the N convolutional layers 1020 included in the CNN 1000 may receive data, may process the received data, and may generate output data. For example, the neural network may perform convolution between the image input to a convolutional layer and one or more kernels or filters to generate a first feature map 1021. Also, the neural network may obtain a second feature map 1022 by subsampling the generated first feature map, and may generate a third feature map 1023 by inputting the second feature map 1022 to a second convolutional layer and performing convolution between the second feature map input to the second convolutional layer and one or more kernels or filters.

Initial convolutional layers of the CNN 1000 may operate to extract low-level features such as edges or gradients from the input image. Later convolutional layers may extract more complex features.

One or more convolutional layers receiving and output feature maps in the CNN 1000 may 1000 may be hidden layers (e.g., hidden convolutional layers). Also, in the CNN 1000, other processing operations may be performed, in addition to a convolution operation performed by applying one or more kernels to a feature map. For example, operations such as an activation function and pooling may be performed. An image processing apparatus may apply an activation function to convert values of a feature map extracted as a result of performing a convolution operation into nonlinear values indicative of "existence" or "absence" of the feature of a content-executable UI screen. In this case, a ReLu function may be used, but the present disclosure is not limited thereto.

Figure 11:
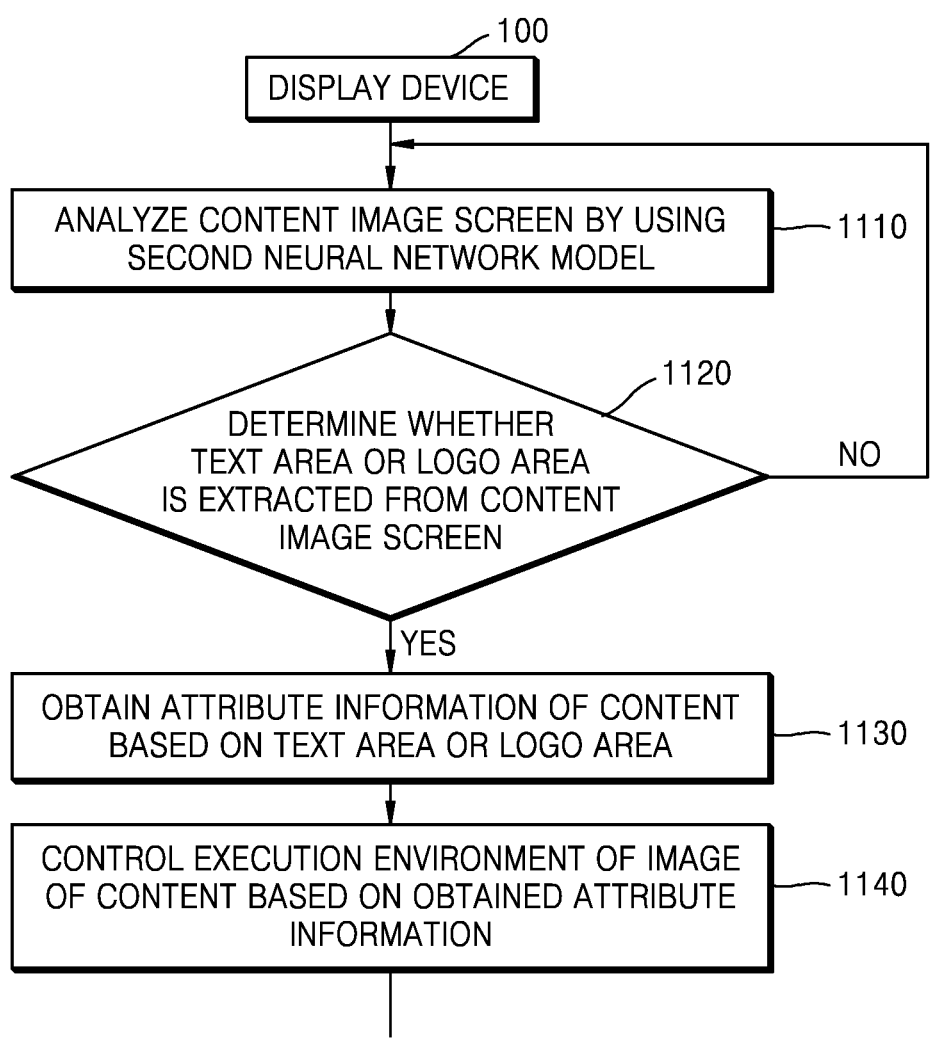
FIG. 11 is a flowchart illustrating an example method by which a display device recognizes content after a content execution start time, according to various embodiments.

FIG. 11 is a flowchart illustrating an example method by which a display device recognizes content after a content execution start time, according to various embodiments.

Referring to FIG. 11, in operation 1110, the display device 100 may analyze a content image screen using a second neural network model. The display device 100 according to an example may be obtained according to the operation of FIG. 8.

The second neural network model is used to detect one or more objects from an input image and may include, for example, a two-stage algorithm such as faster R-CNN, region-based fully convolutional network (R_FCN), or FPN-FRCN or a single-stage algorithm such as YOLO, single shot multibox detector (SSD), or RetinaNet.

According to an embodiment, because the second neural network model may include an object detection model trained using a plurality of input images including text and a plurality of input images including a logo image to detect an object including text or a logo from an input screen.

Figure 12:
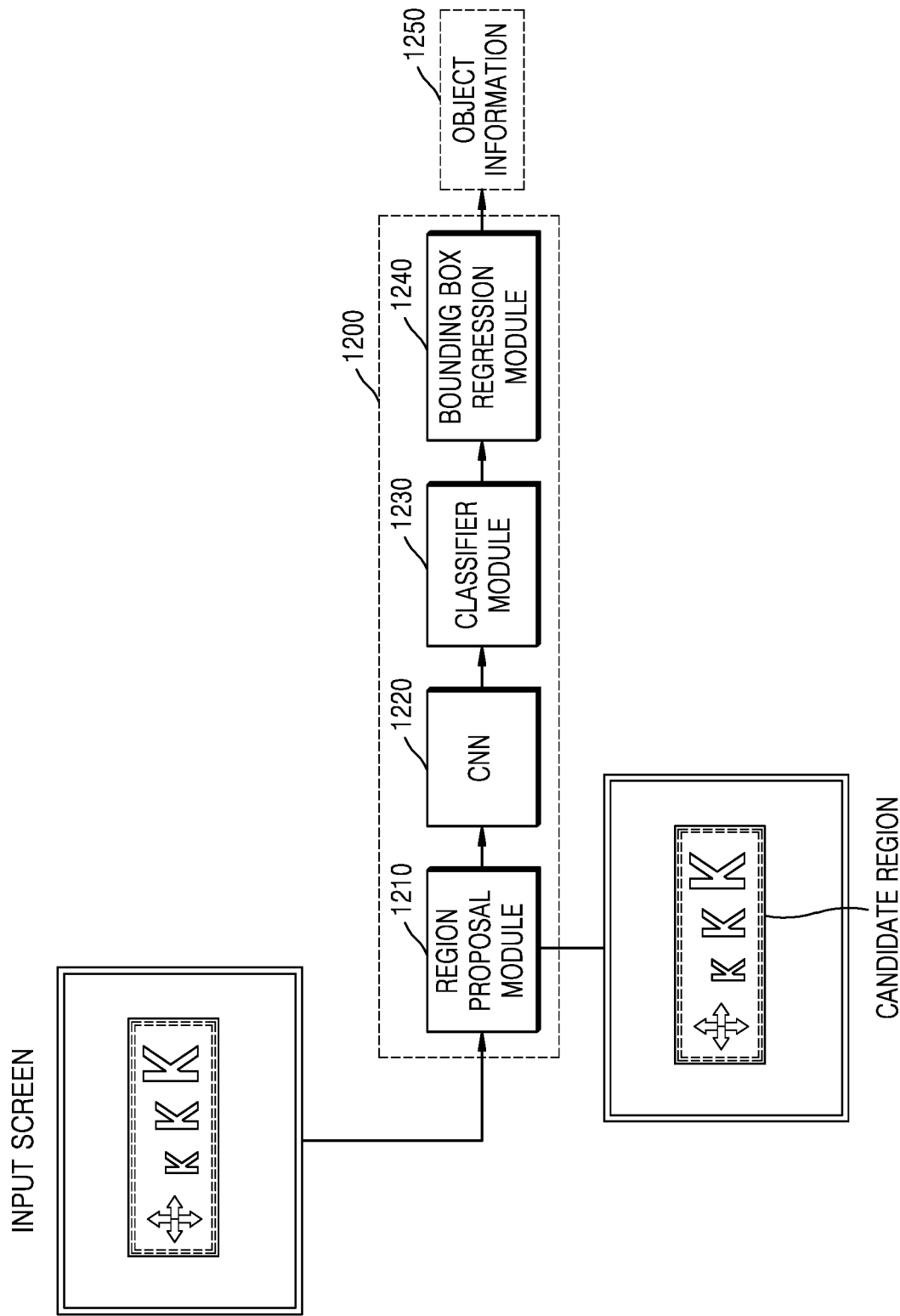
FIG. 12 is a diagram illustrating an example of an object detection model, according to various embodiments.

FIG. 12 is a diagram illustrating an example of an object detection model, according to various embodiments.

An object detection model may detect at least one object from an input image using at least one neural network and may output object information including an object class and an object location corresponding to the detected at least one object.

Object detection involves determining where objects are located in a given image (object localization) and determining which category each object belongs to (object classification). Accordingly, in general, an object detection model may go through three steps, that is, selecting an object candidate region (informative region selection), extracting features from each candidate region (feature extraction), and classifying a class of each object candidate region by applying a classifier to the extracted features (classification). According to a detection method, localization performance may be improved through post-processing such as bounding box regression.

FIG. 12 illustrates a network structure of an R-CNN that is an object detection method obtained by combining CNN with region proposal according to an example of an object detection model.

Referring to FIG. 12, an object detection model 1200 may include a region proposal module 1210, a CNN 1220, a classifier module 1230, and a bounding box regression module 1240, each of which may include various processing circuitry and/or executable program instructions.

The region proposal module 1210 extracts a candidate region from an input image 200. There may be a certain number of candidate regions, for example, 2000 regions. The R-CNN uses selective search that is one of region proposal algorithms.

The convolutional neural network (CNN) 1220 extracts a fixed-length feature vector from the region generated by the region proposal module 1210. Because the CNN (e.g., AlexNet or VggNet) receives an input of a certain size, it is necessary to warp various rectangular regions given by the region proposal algorithm for the image to the certain size regardless of the size or aspect ratio. The CNN receives the warped region and extracts a result of a layer before the classifier module.

The classifier module (linear svm module) 1230 receives a fixed-length feature vector as an input and performs classification. For example, the classifier module 1230 may classify whether an object corresponds to text or a logo.

The bounding box regression module 1240 receives the fixed-length feature vector as an input and calculates four numbers (x, y, w, h) representing a box. A location of the object may be specified by the four numbers (x, y, w, h) representing the box.

That is, the R-CNN performs localization of an object through region proposal extraction and performs object detection by recognizing a class of the object through classification of extracted features. A localization error may be reduced by performing bounding box regression.

As to training of the object detection model 1200, in order to transform a pre-trained CNN to suit an object detection task, a classification layer (e.g., an output layer) in the existing pre-trained CNN is changed to "the number of objects+background" for new object detection and weight initialization is performed only on the corresponding portion.

For example, such an object detection model may detect one or more objects from an input image. Object information 1250 may include information about the one or more objects and each object information may be displayed as (object class, location). The object class may indicate a logo or text.

Referring back to FIG. 11, in operation 1120, the display device 100 may determine whether a text area or a logo area is extracted from the content image screen.

When it is determined in operation 1120 that a text area or a logo area is not detected from the content image screen, operation 1110 may be performed to analyze a next screen.

When it is determined in operation 1120 that a text area or a logo area is detected from the content image screen, operation 1130 may be performed.

In operation 1130, the display device 100 may obtain attribute information of the content based on the detected text area or logo area.

According to an embodiment, when the display device 100 detects the text area from the image screen, the display device 100 may extract text from the text area and may obtain attribute information of the content based on the extracted text. The display device 100 may extract text from the text area using technology such as optical character recognition (OCR). The display device 100 may transmit the text extracted from the text area to the server 300 managing information about pieces of content and may receive attribute information of the content corresponding to the text from the server 300. For example, the server may receive the text from the display device 100, may search for content corresponding to the text, may find information about the content, may extract information about the content, for example, attribute information such as a category, a genre, and viewing age information of the content, and may transmit the extracted attribute information of the content to the display device 100. When the text received from the display device 100 is not complete text or when the content is searched using the text but related content is not found, the server 300 may transmit a result indicating a search failure to the display device 100.

Figure 13:
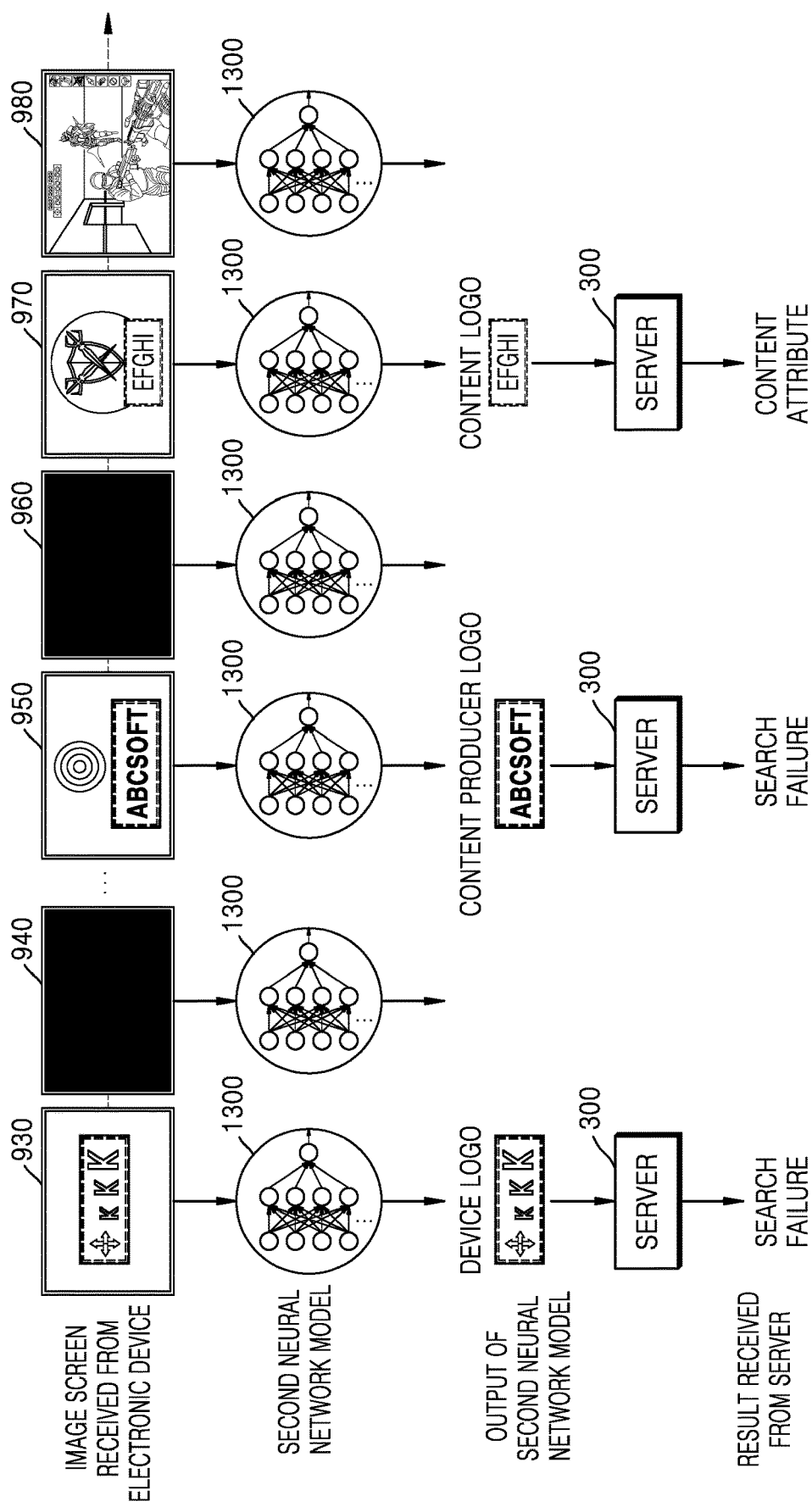
FIG. 13 is a diagram illustrating an example process of obtaining attribute information of content by analyzing an image screen, according to various embodiments.

FIG. 13 is a diagram illustrating an example process of obtaining attribute information of content by analyzing an image screen, according to various embodiments.

Referring to FIG. 13, it is assumed that the display device 100 sequentially receives image screens 930, 940, 950, 960, 970 and 980 from the electronic device 200 connected to the display device 100.

The display device 100 may input the image screen 930 received from the electronic device 200 to a second neural network model 1300 trained to detect an object area, for example, a text area or a logo area, from an image and may obtain a logo area detection result 931 from the image screen 930. Next, the display device 100 may transmit the detected logo area image to the server 300. The server 300 may perform an operation such as image search using the logo area image received from the display device 100 and may analyze what content the logo area image is related to. When the logo area image 931 is not related to certain specific content but is a logo image related to a specific electronic device, the server may transmit a result indicating a search failure to the display device 100.

Because the display device 100 receives the result indicating a search failure from the server 300, the display device 100 continuously analyzes the image received from the electronic device 200.

The display device 100 inputs the image screen 940 received from the electronic device 200 to the second neural network model 1300. Because the image screen 940 is a black screen, the second neural network model may output that no object is detected as an object detection result.

The display device 100 may input the image screen 950 received from the electronic device 200 to the second neural network model 1300 and may obtain a logo area detection result 951 from the image screen 950. Next, the display device 100 may transmit the detected logo area image 951 to the server 300. The server may perform an operation such as image search using the logo area image received from the display device 100 and may analyze what content the logo area image is related to. When the logo area image 951 is not related to certain specific content but is a logo image related to a specific content producer, the server may transmit a result indicating a search failure to the display device 100.

The display device 100 may input the image screen 960 received from the electronic device 200 to the second neural network model 1300. Because the image screen 960 is a black screen, the second neural network model may output that no object is detected as an object detection result.

The display device 100 may input the image screen 970 received from the electronic device 200 to the second neural network model 1300 and may obtain a text area detection result 971 from the image screen 970. Next, the display device 100 may extract text from the text area image 971 by analyzing the detected text area image 971 using technology such as OCR. The display device 100 may transmit the extracted text to the server 300. The server 300 may search for content corresponding to the text received from the display device 100. The server 300 may transmit attribute information of the searched content to the display device 100 as a result of searching for the content corresponding to the text.

The display device 100 extracts its text by itself from a text area image and transmits the extracted text to the server 300, but the present disclosure is not limited thereto. The display device 100 may transmit the entire text area image to the server 300, and the server 300 may extract text from the extracted text area image from the display device 100.

Referring back to FIG. 11, in operation 1140, the display device 100 may control an execution environment of the content based on the attribute information of the content obtained in operation 1130. The controlling of the execution environment of the content may include setting image quality, setting sound, or providing a user viewing age restriction service according to the attribute of the content. When the display device 100 receives information about a genre or a category of the content as the attribute information of the content, the display device 100 may set image quality or sound according to the genre or the category of the content. Also, when the display device 100 receives viewing age information as the attribute information of the content, the display device 100 may control viewing restriction by outputting an appropriate guide message based on the viewing age information or outputting a message for requesting a password input.

Figure 14:
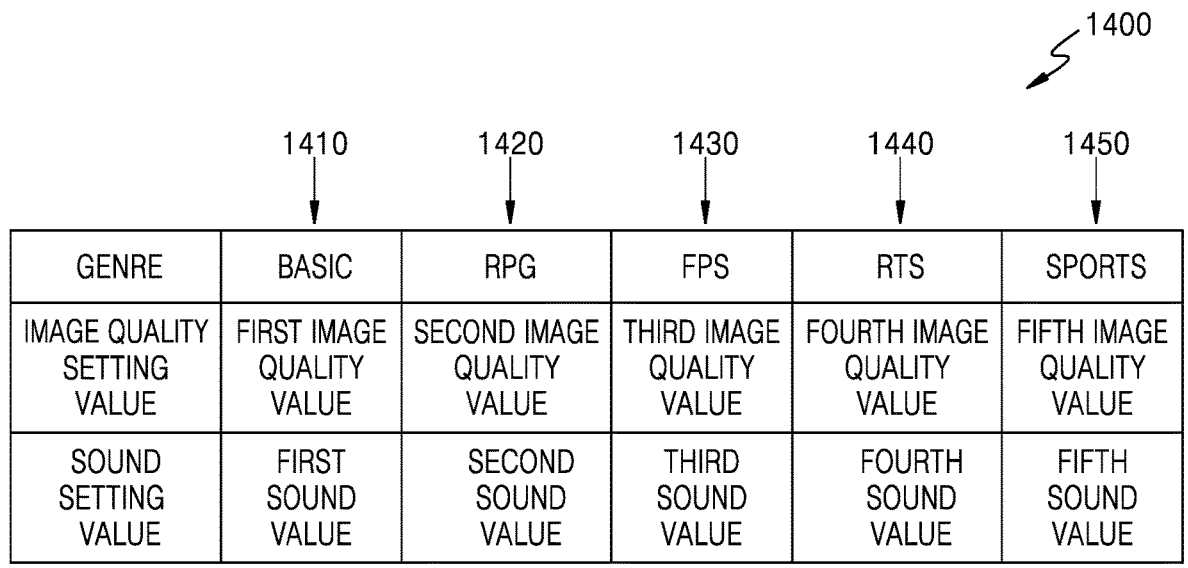
FIG. 14 is a table including an image quality setting value and a sound setting value set according to a genre of content, according to various embodiments.

FIG. 14 is a table including an image quality setting value and a sound setting value set according to a genre of content, according to various embodiments.

Referring to FIG. 14, when content is, for example, game content, the display device 100 may store an image quality/sound setting table 1400 including an image quality setting value and a sound setting value differently set according to a genre of game content.

The image quality/sound setting table 1400 may include, as a genre of game content, for example, a basic genre 1410 that, a role-playing game (RPG) genre 1420 that is a role playing game where users enjoy while assuming the roles of characters, a first-person shooter (FPS) game genre 1430 that is a shooting game where battles seen from a first-person perspective (e.g., a player or himself/herself) occur using weapons or tools, a real-time strategy (RTS) genre 1440 that is a strategy game played in real time where a participant collects resources and builds a building or produces troops using the collected resources and that is over when a civilization is developed or the participant wins a war, and a sports genre 1450.

The display device 100 may map different image quality values according to attributes of game content of genres included in the table 1400. A first image quality value may be mapped to the basic genre 1410, a second image quality value may be mapped to the RPG genre 1420, a third image quality value may be mapped to the FPS genre 1430, a fourth image value may be mapped to the RTS genre 1440, and a fifth image quality value may be mapped to the sports genre 1450. For example, a first-person shooting game such as FPS requires a higher level of realism than other games because a game character's point view should be the same as a player's point of view, and thus, a third image quality value including image quality values that may achieve a further level of realism may be set to the first-person shooting game.

The display device 100 may map different sound values according to attributes of content of genres included in the table 1400. A first sound value may be mapped to the basic genre 1410, a second sound value may be mapped to the RPG genre 1420, a third sound value may be mapped to the FPS genre 1430, a fourth sound value may be mapped to the RTS genre 1440, and a fifth sound value may be mapped to the sports genre 1450.

When the display device 100 recognizes that a genre of game content is RPG as attribute information of the content with reference to the table 1400, the display device 100 may extract the second image quality value and the second sound value corresponding to the RPG genre and may set the image quality and sound of the display device 100 according to the second image quality value and the second sound value.

Figure 15:
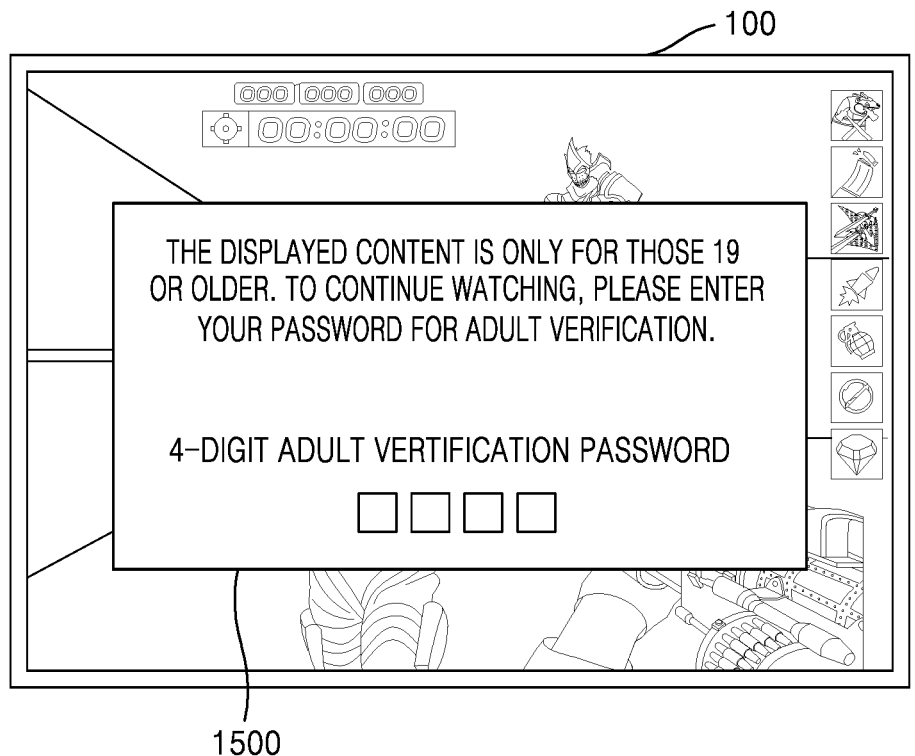
FIG. 15 is a diagram illustrating an example operation of a display device when viewing age information is received as attribute information of content, according to various embodiments.

FIG. 15 is a diagram illustrating an example operation of a display device when viewing age information is received as attribute information of content, according to various embodiments.

Referring to FIG. 15, when the display device 100 receives viewing age information of content as attribute information of the content, the display device 100 may provide a viewing age restriction service based on the received viewing age information. For example, when the display devices receives information indicating that a viewing age of content is 19 years or older as attribute information of the content, the display device 100 may output a user interface 1500 as shown in FIG. 15.

The user interface 1500 may provide an input window where a 4-digit adult verification password may be input together with a message saying "The displayed content is only for those 19 or older. To continue watching, please enter your password for adult verification". A user may display the content by inputting his/her password to the input window of the user interface 1500.

Figure 16:
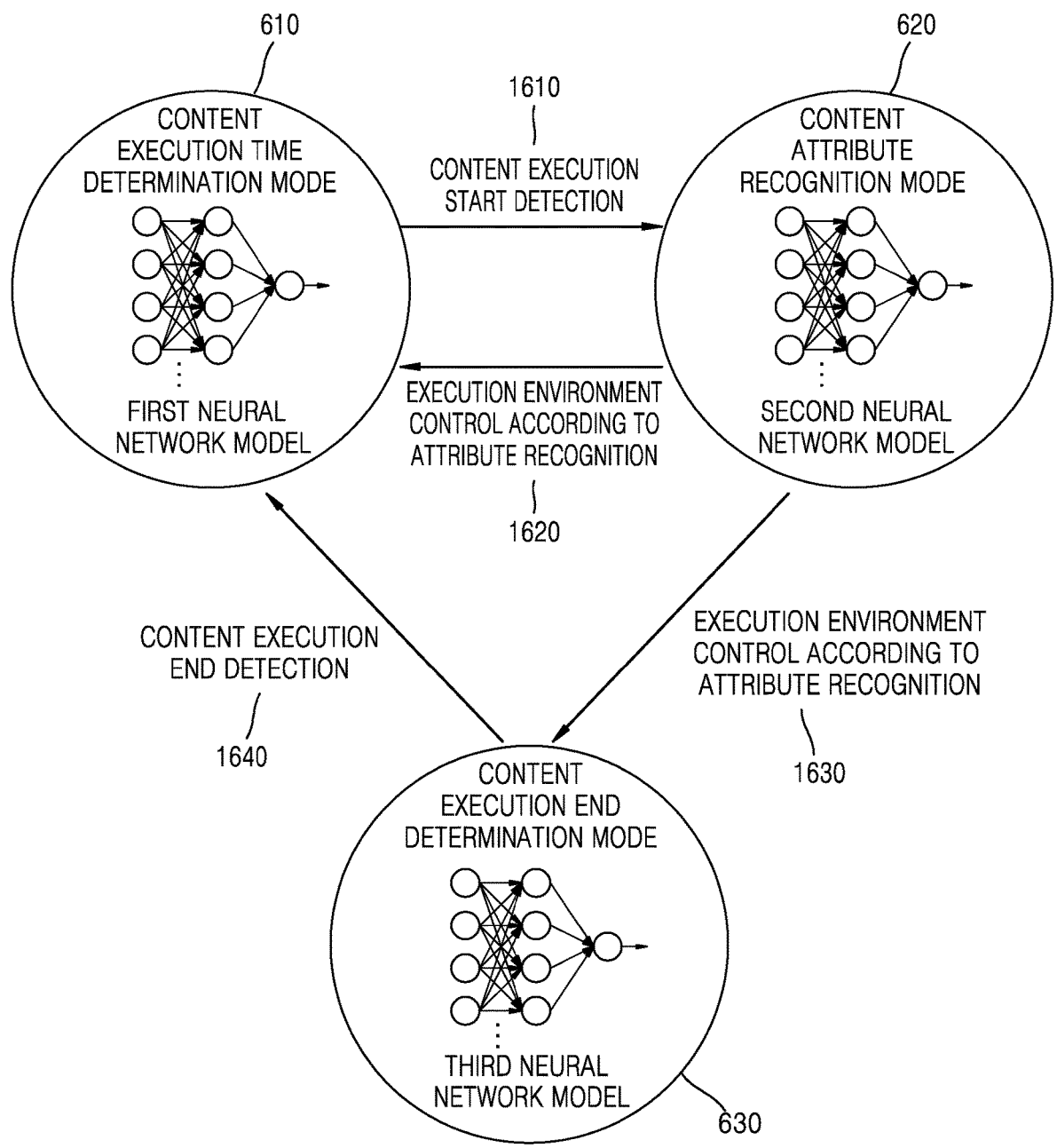
FIG. 16 is a diagram illustrating example switching between a content execution time determination mode and a content attribute recognition mode, according to various embodiments.

FIG. 16 is a diagram illustrating example switching between a content execution time determination mode and a content attribute recognition mode, according to various embodiments.

Referring to FIG. 16, in a content execution time determination mode 610, the display device 100 may determine an execution start time of content using a first neural network model corresponding to an electronic device connected to the display device 100. When the display device 100 detects that execution of the content starts in the content execution time determination mode 610, the display device 100 may enter (1610) a content attribute recognition mode 620 to obtain attribute information of the executed content. In the content attribute recognition mode 620, the display device 100 may analyze an image screen received from the electronic device 200 using a second neural network model to extract a logo area or a text area from the image screen and obtain attribute information of the executed content based on the extracted logo area or text area. The display device 100 may control a content execution environment according to the obtained attribute information of the content and may re-enter (1620) the content execution time determination mode 610.

The display device 100 may control a content execution environment according to the obtained attribute information of the content and may enter a content execution end determination mode 1630. In the content execution end determination mode 1630, the display device 100 may detect whether the execution of the content ends using a third neural network model trained to analyze the image screen received from the electronic device 200 to detect a screen indicating that the execution of the content ends. When the display device 100 detects that the execution of the content ends in the content execution end determination mode 630, the display device 100 may enter (1640) the content execution time determination 610 to monitor whether execution of next new content starts.

Because detecting the start of execution of content in the content execution time determination mode 610 or detecting content attribute in the content attribute recognition mode 620 is performed in a relatively short time interval, it may be appropriate to analyze an image screen to be analyzed by sampling the image screen at shorter time intervals. In contrast, determining the end of execution of content in the content execution end determination mode 630 is generally performed for a relatively long time interval, that is, while the execution of the content continues. Accordingly, in this case, it may be possible to analyze an image screen to be analyzed by sampling the image screen at longer time intervals.

Various embodiments may be implemented in the form of a computer-readable recording medium that includes computer-executable instructions such as program modules executed by a computer. The computer-readable medium may be an arbitrary available medium accessible by a computer, and includes all volatile and non-volatile media and separable and non-separable media. The computer-readable medium may also include a computer storage medium. Examples of the computer storage medium include all volatile and non-volatile media and separable and non-separable media, which have been implemented by an arbitrary method or technology, for storing information such as computer-readable instructions, data structures, program modules, and other data.

Disclosed embodiments may be implemented as a software program including instructions stored in a computer-readable storage medium.

The computer may refer, for example, to a device capable of fetching instructions stored in a storage medium and operating according to the disclosed embodiments based on the instructions, and may include an electronic device according to the disclosed embodiments.

The computer-readable storage medium may be provided in the form of a non-transitory storage medium. A, 'non-transitory' storage medium does not include a signal and is tangible, but may not distinguish whether data is stored semi-permanently or temporarily in the storage medium.

Furthermore, control methods according to disclosed embodiments may be included and provided in a computer program product. The computer program product is a product purchasable between a seller and a purchaser.

The computer program product may include a software program and a computer-readable storage medium in which the software program is stored. For example, the computer program product may include a product in the form of a software program (e.g., a downloadable application) that is electronically distributed by a manufacturer of a device or by an electronic market (e.g., Google Play Store™, or App Store™). For electronic distribution, at least a portion of the software program may be stored in a storage medium or temporarily generated. In this case, the storage medium may be a storage medium of a server of the manufacturer, a server of the electronic market, or a relay server that temporarily stores the software program.

In a system including a server and a device, the computer program product may include a storage medium of the server or a storage medium of the device. Alternatively, when there is a third device (e.g., a smartphone) communicatively connected to the server or the device, the computer program product may include a storage medium of the third device. The computer program product may include a software program itself that is transmitted from the third party to the device, or transmitted from the server to the device or the third device.

In this case, one of the server, the device, and the third device may execute the computer program product to perform the method according to the disclosed embodiments. Two or more of the server, the device, and the third device may execute the computer program product to perform the method according to the disclosed embodiments in a distributed fashion.

For example, the server (e.g., a cloud server or an artificial intelligence (AI) server) may execute the computer program product stored therein to control the device communicatively connected to the server to perform the method according to the disclosed embodiments.

In yet another example, the third device may execute the computer program product to control the device communicatively connected to the third device to perform the method according to the disclosed embodiments. When the third device executes the computer program product, the third device may download the computer program product from the server and execute the downloaded computer program product. Alternatively, the third device may execute the computer program product that is preloaded to perform the method according to the disclosed embodiments.

The term "unit" used herein may refer, for example, to a hardware component such as a processor or a circuit, and/or a software component executed by a hardware component such as a processor.

The above description of the present disclosure is provided for illustration, and it will be understood by one of ordinary skill in the art that various changes in form and details may be readily made therein without departing from essential features and the scope of the present disclosure including the appended claims and their equivalents. Accordingly, the above embodiments are examples only in all aspects and are not limited. For example, each component described as a single type may be implemented in a distributed manner, and similarly, components described as distributed may be implemented in a combined form. It will also be understood that any of the embodiment(s) described herein may be used in conjunction with any other embodiment(s) described herein.

What is claimed is:

1. A display device comprising:
a display;
an input/output interface comprising circuitry;
a communication interface comprising communication circuitry;
a memory in which one or more instructions are stored; and
at least one processor, comprising processing circuitry, individually and/or collectively, configured to execute the one or more instructions stored in the memory to cause the display device to:
display an image screen received from an electronic device connected to the display device,
determine, using a first neural network model, whether execution of content starts based on analyzing the displayed image screen, by determining whether switching occurs from a content-executable user interface (UI) screen to a content-inexecutable UI screen, the content-executable UI screen indicating a UI screen which is manipulatable by a user input, and the content-inexecutable UI screen indicating an UI screen which is not manipulatable by the user input, wherein the first neural network model is a model trained based on image screens provided from the electronic device to classify a plurality of UI screens into the content-executable UI screen and the content-inexecutable UI screen, determine that the execution of the content starts based on determining that switching occurs from the content-executable UI screen to the content-inexecutable UI screen, based on determining that the execution of the content starts, obtain attribute information of the content by analyzing the image screen of the content using a second neural network model, and control an execution environment of the content based on the obtained attribute information.

2. The display device of claim 1, wherein at least one processor, individually and/or collectively, is configured to execute the one or more instructions to cause the display device to:

identify the electronic device from a high-definition multimedia interface consumer electronics control (HDMI CEC) received through HDMI communication from the electronic device, and obtain the first neural network model trained corresponding to the identified electronic device.

3. The display device of claim 1, wherein the second neural network model comprises a model which receives a plurality of image screens as training data and is trained to detect a text area or a logo area from the plurality of image screens.

4. The display device of claim 3, wherein at least one processor, individually and/or collectively, is configured to execute the one or more instructions to cause the display device to:

extract the text area or the logo area from the plurality of image screens by inputting the plurality of image screens to the second neural network model and analyzing the image screens, and obtain attribute information of the content based on the text area or the logo area.

5. The display device of claim 4, wherein at least one processor, individually and/or collectively, is configured to execute the one or more instructions to cause the display device to:

transmit text extracted from the text area or the logo area to a server, and obtain attribute information of the content by receiving attribute information of the content related to the text or the logo area from the server.

6. The display device of claim 1, wherein at least one processor, individually and/or collectively, is configured to execute the one or more instructions to cause the display device to: control the execution environment of the content by controlling at least one of image quality setting, sound setting, viewing age restriction setting, and display device environment setting suitable for the content based on the obtained attribute information.

7. The display device of claim 1, wherein at least one processor, individually and/or collectively, is configured to execute the one or more instructions to cause the display device to:

determine whether the execution of the content ends based on the controlling of the execution environment of the content, and determine whether execution of new content starts by analyzing an image screen using the first neural network model based on determining that the execution of the content ends.

8. A method of operating a display device, the method comprising:

displaying an image screen received from an electronic device connected to the display device, determining whether execution of content starts based on analyzing the displayed image screen using a first neural network model, by determining whether switching occurs from content-executable user interface (UI) screen to a content-inexecutable UI screen, the content-executable UI screen indicating a UI screen which is manipulatable by a user input, and the content-inexecutable UI screen indicating an UI screen which is not manipulatable by the user input, wherein the first neural network model is a model trained based on image screens provided from the electronic device to classify a plurality of UI screens into the content-executable UI screen and the content-inexecutable UI screen, determining that the execution of the content starts based on determining that switching occurs from the content-executable UI screen to the content-inexecutable UI screen, based on determining that the execution of the content starts, obtaining attribute information of the content by analyzing the image screen of the content using a second neural network model, and controlling an execution environment of the content based on the obtained attribute information.

9. The method of claim 8, further comprising:

identifying the electronic device from a high-definition multimedia interface consumer electronics control (HDMI CEC) received through HDMI communication from the electronic device; and obtaining the first neural network model trained corresponding to the identified electronic device.

10. The method of claim 8, wherein the second neural network model comprises a model trained to receive a plurality of image screens as training data and detect a text area or a logo area from the plurality of image screens.

11. A non-transitory computer-readable recording medium having recorded thereon at least one program which, when executed by at least one processor, individually and/or collectively, of a display device cause the display device to perform operations comprising:

displaying an image screen received from an electronic device connected to the display device, determining whether execution of content starts based on analyzing the displayed image screen using a first neural network model, by determining whether switching occurs from a content-executable user interface (UI) screen to a content-inexecutable UI screen, the content-executable UI screen indicating a UI screen which is manipulatable by a user input, and the content-inexecutable UI screen indicating an UI screen which is not manipulatable by the user input, wherein the first neural network model is a model trained based on image screens provided from the electronic device to classify a plurality of UI screens into the content-executable UI screen and the content-inexecutable UI screen, determining that the execution of the content starts based on determining that switching occurs from the content-executable UI screen to the content-inexecutable UI screen, based on determining that the execution of the content starts, obtaining attribute information of the content by analyzing the image screen of the content using a second neural network model, and controlling an execution environment of the content based on the obtained attribute information.

12. The display device of claim 1, wherein the attribute information comprises metadata of the content.

13. The method of claim 8, wherein the attribute information comprises metadata of the content.

14. The non-transitory computer-readable recording medium of claim 11, wherein the attribute information comprises metadata of the content.

\* \* \* \* \*